United States Patent
Tsuruga et al.

(10) Patent No.: US 9,347,203 B2
(45) Date of Patent: May 24, 2016

(54) ELECTRIC DRIVE UNIT FOR CONSTRUCTION MACHINE

(75) Inventors: Yasutaka Tsuruga, Moriyama (JP); Kiwamu Takahashi, Koka (JP); Tatsuo Takishita, Koka (JP); Hajime Kurikuma, Koka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 176 days.

(21) Appl. No.: 14/113,658

(22) PCT Filed: May 10, 2012

(86) PCT No.: PCT/JP2012/061968
§ 371 (c)(1),
(2), (4) Date: Oct. 24, 2013

(87) PCT Pub. No.: WO2012/160984
PCT Pub. Date: Nov. 29, 2012

(65) Prior Publication Data
US 2014/0046552 A1 Feb. 13, 2014

(30) Foreign Application Priority Data
May 25, 2011 (JP) .............................. 2011-117449

(51) Int. Cl.
*E02F 3/32* (2006.01)
*E02F 9/20* (2006.01)
(Continued)

(52) U.S. Cl.
CPC ............... *E02F 9/2246* (2013.01); *B60L 1/003* (2013.01); *B60L 7/14* (2013.01); *B60L 11/1846* (2013.01);
(Continued)

(58) Field of Classification Search
CPC .......... E02F 3/325; E02F 9/207; E02F 9/2091
See application file for complete search history.

(56) References Cited

U.S. PATENT DOCUMENTS

| 6,199,307 | B1 * | 3/2001 | Kagoshima | E02F 3/325 37/443 |
| 6,282,892 | B1 * | 9/2001 | Arai | 60/450 |

(Continued)

FOREIGN PATENT DOCUMENTS

| EP | 0962597 A2 | 12/1999 |
| JP | 10-096250 A | 4/1998 |
| JP | 2010-121328 A | 6/2010 |

OTHER PUBLICATIONS

International Preliminary Report on Patentability received in International Application No. PCT/JP2012/061968 dated Dec. 5, 2013.
Partial Supplementary European Search Report received in corresponding European Application No. 12790266.6 dated May 4, 2015.

*Primary Examiner* — Todd Melton
(74) *Attorney, Agent, or Firm* — Mattingly & Malur, PC

(57) ABSTRACT

An electric drive unit for a construction machine is capable of increasing the operating time of the construction machine. The electric drive unit has an electricity storage device, a hydraulic pump of the fixed displacement type which is driven by a motor/generator, a plurality of directional control valves which respectively control the flow of hydraulic fluid supplied to a plurality of hydraulic actuators, a bidirectional converter which performs variable control on the revolution speed of the motor/generator, and an LS control device which controls the bidirectional converter so that LS differential pressure Pls equals a target value Pgr. The bidirectional converter performs regeneration control for converting the inertial force of the rotor of the motor/generator into electric power thereby charging the electricity storage device when the revolution speed of the motor/generator is decreased in response to an excess of the LS differential pressure Pls over the target value Pgr.

4 Claims, 15 Drawing Sheets

(51) Int. Cl.
  *E02F 9/22* (2006.01)
  *B60L 1/00* (2006.01)
  *B60L 7/14* (2006.01)
  *B60L 11/18* (2006.01)
  *B60L 15/20* (2006.01)

(52) U.S. Cl.
  CPC ............. *B60L 15/2009* (2013.01); *E02F 3/325* (2013.01); *E02F 9/207* (2013.01); *E02F 9/2091* (2013.01); *B60L 2200/40* (2013.01); *B60L 2240/421* (2013.01); *B60L 2250/24* (2013.01); *B60L 2270/142* (2013.01); *B60L 2270/145* (2013.01); *Y02T 10/642* (2013.01); *Y02T 10/7005* (2013.01); *Y02T 10/7275* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 6,945,039 | B2 * | 9/2005 | Yoshino | 60/414 |
| 7,086,226 | B2 * | 8/2006 | Oguri | 60/414 |
| 7,712,309 | B2 * | 5/2010 | Vigholm | 60/414 |
| 2007/0089924 | A1 * | 4/2007 | de la Torre et al. | 180/305 |
| 2009/0288408 | A1 * | 11/2009 | Tozawa et al. | 60/435 |
| 2010/0186404 | A1 * | 7/2010 | Yasufuku et al. | 60/459 |

* cited by examiner

ELECTRIC DRIVE UNIT FOR CONSTRUCTION MACHINE

TECHNICAL FIELD

The present invention relates to a construction machine such as an electric hydraulic excavator, and in particular, to an electric drive unit for a construction machine that is equipped with a motor/generator which drives a hydraulic pump supplying hydraulic fluid to a plurality of hydraulic actuators and an electricity storage device which supplies and receives electric power to/from the motor/generator.

BACKGROUND ART

A mini-excavator (i.e., hydraulic excavator whose operating mass is less than 6 tons) as an example of the construction machine generally comprises a lower travel structure, an upper rotating structure which is mounted on the lower travel structure to be rotatable, and a multijoint work implement (having a boom, an arm and a bucket) which is mounted on the upper rotating structure to be elevatable. The mini-excavator is equipped with, for example, a hydraulic pump, a plurality of hydraulic actuators (e.g., a boom hydraulic cylinder, an arm hydraulic cylinder, a bucket hydraulic cylinder, etc.), a plurality of directional control valves for respectively controlling the flow of the hydraulic fluid from the hydraulic pump to the hydraulic actuators, and operating means for controlling the directional control valves (specifically, a plurality of operating devices each of which outputs pilot pressure corresponding to the operating position of a control lever, for example).

In recent years, electric mini-excavators, employing an electric motor (motor/generator) instead of the engine as the driving source for the aforementioned hydraulic pump, are being proposed (see Patent Literature 1, for example) in consideration of their advantages of not emitting the exhaust gas and also reducing the noise and vibration significantly.

PRIOR ART LITERATURE

Patent Literature

Patent Literature 1: JP-2010-121328-A

SUMMARY OF THE INVENTION

Problem to be Solved by the Invention

The electric mini-excavators mentioned above include those employing an electricity storage device having a plurality of batteries as the electric power supply for the electric motor. The electric mini-excavators equipped with an electricity storage device do not need to be constantly connected to an external power supply by use of a power cable. Such electric mini-excavators, not connected to an external power supply by use of a power cable during the operation/work, have an advantage in that their movement and rotating operation are not restricted. However, there are certain limitations on the number of batteries that can be mounted on the mini-excavator and on the capacity (capacitance) of the electricity storage device. Specifically, a mini-excavator of the so-called "minimal tail swing radius type" or "minimal swing radius type" has a limitation on the swing radius in regard to the rear end of the upper rotating structure or the whole of the upper rotating structure. Further, the cab for the operator and various hydraulic devices such as directional control valves, the hydraulic pump and the hydraulic fluid tank are mounted on the upper rotating structure. Therefore, the number of batteries that can be mounted on the upper rotating structure is limited due to the limitation on the space on the upper rotating structure usable for mounting the batteries without impairing the visibility from the operator. Consequently, there is a limitation on the capacity (capacitance) of the electricity storage device mounted on the mini-excavator, by which the operating time of the mini-excavator is limited in the case where the mini-excavator is not connected to an external power supply by use of a power cable.

It is therefore the primary object of the present invention to provide an electric drive unit for a construction machine capable of increasing the operating time of the construction machine (which is limited by the electricity storage device mounted on the construction machine) from the currently possible operating time by use of the power generation operation of the motor/generator.

Means for Solving the Problem (1) To achieve the above object, the present invention provides an electric drive unit for a construction machine equipped with an electricity storage device, a motor/generator which supplies and receives electric power to/from the electricity storage device, a hydraulic pump which is driven by the motor/generator, a plurality of hydraulic actuators, a plurality of operating means which command the operation of the hydraulic actuators, and a plurality of directional control valves which respectively control the direction and the flow rate of hydraulic fluid supplied from the hydraulic pump to the hydraulic actuators according to operating directions and operation amounts of the plurality of operating means. The electric drive unit for a construction machine comprises: motor/generator control means which performs variable control on the revolution speed of the motor/generator; and command control means which calculates a command value for the motor/generator control means according to the change in a demanded flow rate determined based on operation command levels from the plurality of operating means. The motor/generator control means performs regeneration control for converting inertial force of a rotor of the motor/generator into electric power and thereby charging the electricity storage device when the revolution speed of the motor/generator is decreased in response to a decrease in the demanded flow rate.

According to the invention, the operating time of the construction machine can be increased by performing the regeneration control for converting the inertial force of the rotor of the motor/generator into electric power and thereby charging the electricity storage device when the revolution speed of the motor/generator is decreased in response to a decrease in the demanded flow rate.

(2) Preferably, the above electric drive unit (1) for a construction machine comprises: a plurality of pressure compensating valves which perform control so that differential pressure across each of the directional control valves equals load sensing differential pressure defined as differential pressure between delivery pressure of the hydraulic pump and the maximum load pressure of the hydraulic actuators; and differential pressure detecting means which detects the load sensing differential pressure. The command control means calculates the command value for the motor/generator control means according to the difference between the load sensing differential pressure detected by the differential pressure detecting means and a preset target value so that the load sensing differential pressure equals the target value. The motor/generator control means performs the regeneration control for converting the inertial force of the rotor of the motor/generator into electric power and thereby charging the electricity storage device when the revolution speed of the motor/generator is decreased in response to an excess of the load sensing differential pressure over the target value.

According to the invention, the operating time of the construction machine can be increased by performing the regeneration control for converting the inertial force of the rotor of the motor/generator into electric power and thereby charging the electricity storage device when the revolution speed of the motor/generator is decreased in response to an excess of the load sensing differential pressure over the target value (i.e., in response to a decrease in the demanded flow rate).

(3) Preferably, the above electric drive unit (1) for a construction machine comprises: a plurality of pressure compensating valves which perform control so that differential pressure across each of the directional control valves equals load sensing differential pressure defined as differential pressure between delivery pressure of the hydraulic pump and the maximum load pressure of the hydraulic actuators; delivery pressure detecting means which detects the delivery pressure of the hydraulic pump; and maximum load pressure detecting means which detects the maximum load pressure of the hydraulic actuators. The command control means sets a target value for the delivery pressure of the hydraulic pump based on the maximum load pressure of the hydraulic actuators detected by the maximum load pressure detecting means and calculates the command value for the motor/generator control means according to the difference between the delivery pressure of the hydraulic pump detected by the delivery pressure detecting means and the target value so that the delivery pressure of the hydraulic pump equals the target value. The motor/generator control means performs the regeneration control for converting the inertial force of the rotor of the motor/generator into electric power and thereby charging the electricity storage device when the revolution speed of the motor/generator is decreased in response to an excess of the delivery pressure of the hydraulic pump over the target value.

According to the invention, the operating time of the construction machine can be increased by performing the regeneration control for converting the inertial force of the rotor of the motor/generator into electric power and thereby charging the electricity storage device when the revolution speed of the motor/generator is decreased in response to an excess of the delivery pressure of the hydraulic pump over the target value (i.e., in response to a decrease in the demanded flow rate).

(4) Preferably, in the above electric drive unit (1) for a construction machine, the directional control valves are valves of the open center type, and the electric drive unit comprises: a restrictor which is arranged in a downstream part of a center bypass line of the directional control valves; control pressure detecting means which detects pressure on the upstream side of the restrictor (changing according to the change in the control level of at least one of the directional control valves switched on the upstream side of the restrictor) as control pressure; revolution speed acquisition means which acquires the revolution speed of the motor/generator; and delivery flow rate calculation means which calculates the delivery flow rate of the hydraulic pump based on the revolution speed of the motor/generator acquired by the revolution speed acquisition means. The command control means sets a target value for the control pressure based on the delivery flow rate of the hydraulic pump calculated by the delivery flow rate calculation means and calculates the command value for the motor/generator control means according to the difference between the control pressure detected by the control pressure detecting means and the target value. The motor/generator control means performs the regeneration control for converting the inertial force of the rotor of the motor/generator into electric power and thereby charging the electricity storage device when the revolution speed of the motor/generator is decreased in response to an excess of the control pressure over the target value.

According to the invention, the operating time of the construction machine can be increased by performing the regeneration control for converting the inertial force of the rotor of the motor/generator into electric power and thereby charging the electricity storage device when the revolution speed of the motor/generator is decreased in response to an excess of the control pressure over the target value (i.e., in response to a decrease in the demanded flow rate).

(5) Preferably, the above electric drive unit (1) for a construction machine comprises: maximum operation amount detecting means which detects the maximum operation amount of the plurality of operating means; revolution speed acquisition means which detects the revolution speed of the motor/generator; and delivery flow rate calculation means which calculates the delivery flow rate of the hydraulic pump based on the revolution speed of the motor/generator detected by the revolution speed acquisition means. The command control means sets the demanded flow rate based on the maximum operation amount of the plurality of operating means detected by the maximum operation amount detecting means and calculates the command value for the motor/generator control means according to the difference between delivery flow rate of the hydraulic pump calculated by the delivery flow rate calculation means and the demanded flow rate so that the delivery flow rate of the hydraulic pump equals the demanded flow rate. The motor/generator control means performs the regeneration control for converting the inertial force of the rotor of the motor/generator into electric power and thereby charging the electricity storage device when the revolution speed of the motor/generator is decreased in response to an excess of the delivery flow rate of the hydraulic pump over the demanded flow rate.

According to the invention, the operating time of the construction machine can be increased by performing the regeneration control for converting the inertial force of the rotor of the motor/generator into electric power and thereby charging the electricity storage device when the revolution speed of the motor/generator is decreased in response to an excess of the delivery flow rate of the hydraulic pump over the demanded flow rate (i.e., in response to a decrease in the demanded flow rate).

Effect of the Invention

According to the present invention, the operating time of the construction machine can be increased by performing the regeneration control for converting the inertial force of the rotor of the motor/generator into electric power and thereby charging the electricity storage device when the revolution speed of the motor/generator is decreased in response to a decrease in the demanded flow rate.

MODE FOR CARRYING OUT THE INVENTION

A first embodiment of the present invention will be described below referring to FIGS. 1 to 5.

Figure 1:
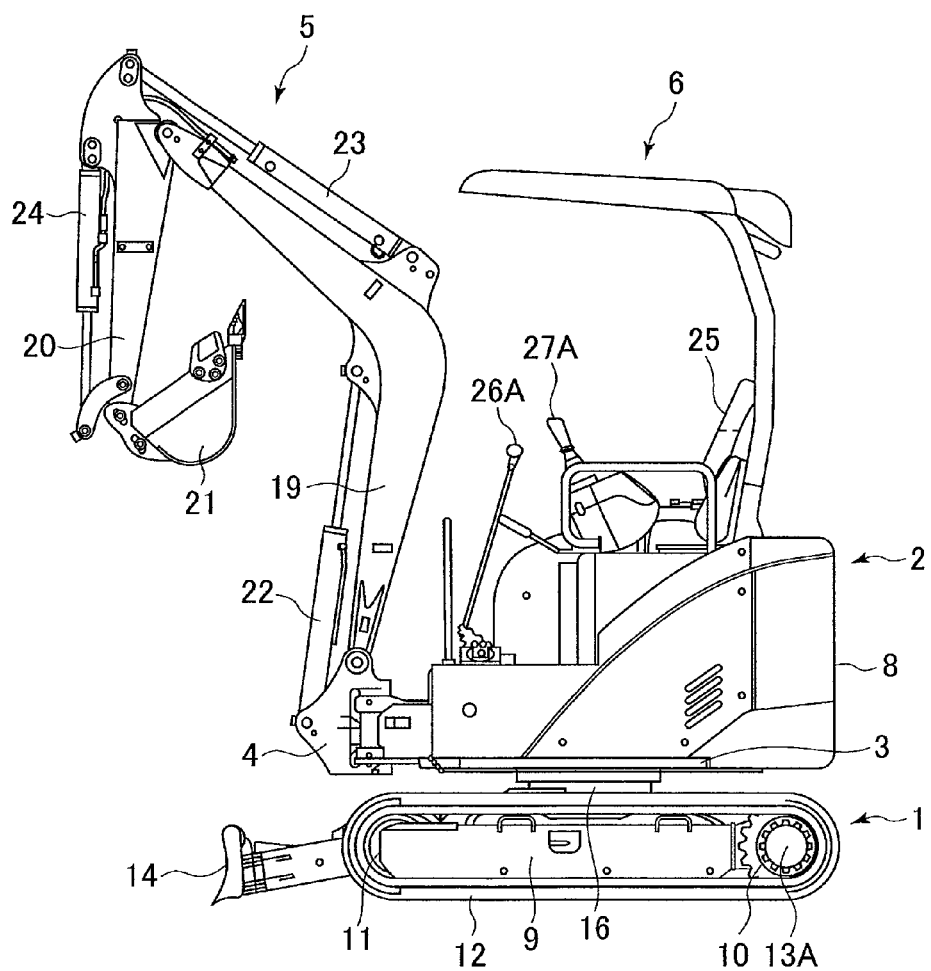
FIG. 1 is a side view showing the overall structure of an electric mini-excavator as a target of application of the present invention.

FIG. 1 is a side view showing the overall structure of an electric mini-excavator as a target of application of the present invention. In the following explanation, directions "front" (left in FIG. 1), "rear" (right in FIG. 1), "right" (behind the sheet of FIG. 1) and "left" (in front of the sheet of FIG. 1) from the viewpoint of the operator seated on the cab seat of the electric mini-excavator in the state shown in FIG. 1 will be referred to simply as "front", "rear", "right" and "left", respectively.

Referring to FIG. 1, the electric mini-excavator comprises a lower travel structure 1 of the crawler type, an upper rotating structure 2 mounted on the lower travel structure 1 to be rotatable, a rotation frame 3 forming the base structure of the upper rotating structure 2, a swing post 4 mounted on a front part of the rotation frame 3 to be able to rotate (swing) left and right, a multijoint work implement 5 connected to the swing post 4 to be rotatable (elevatable) in the vertical direction, a cab 6 of the canopy type formed on the rotation frame 3, and a battery storage part 8 formed on a rear part of the rotation frame 3 to store an electricity storage device 7 (see FIG. 2 which will be explained later) including a plurality of batteries (e.g., lithium batteries). In this embodiment, a power supply socket (unshown) to which a cable from an external power supply is connectable is provided on the side of the upper rotating structure 2.

The lower travel structure 1 includes a track frame 9 in a shape like "H" when viewed from above, left and right driving wheels 10 rotatably supported in the vicinity of the rear ends of left and right side faces of the track frame 9, left and right driven wheels (idlers) 11 rotatably supported in the vicinity of the front ends of the left and right side faces of the track frame 9, and left and right crawlers 12 each stretched between the left/right driving wheel 10 and the left/right driven wheel 11. The left driving wheel 10 (the left crawler 12) is driven and rotated by a left travel hydraulic motor 13A, while the right driving wheel 10 (the right crawler 12) is driven and rotated by a right travel hydraulic motor 13B (see FIG. 2 which will be explained later).

A blade 14 for removing earth is attached to the front of the track frame 9 to be movable up and down. The blade 14 is moved up and down by the expansion/contraction of a blade hydraulic cylinder 15 (see FIG. 2 which will be explained later).

A rotation wheel 16 is provided at the center of the track frame 9 so that the rotation frame 3 can be rotated via the rotation wheel 16. The rotation frame 3 (the upper rotating structure 2) is driven and rotated by a rotation hydraulic motor 17 (see FIG. 2 which will be explained later).

The swing post 4 is attached to the front of the rotation frame 3 to be able to rotate (swing) left and right. The swing post 4 is rotated (swung) left and right by the expansion/contraction of a swing hydraulic cylinder 18 (see FIG. 2 which will be explained later), by which the work implement 5 is swung left and right.

The work implement 5 includes a boom 19 connected to the swing post 4 to be rotatable in the vertical direction, an arm 20 connected to the boom 19 to be rotatable in the vertical direction, and a bucket 21 connected to the arm 20 to be rotatable in the vertical direction. The rotations of the boom 19, the arm 20 and the bucket 21 in the vertical direction are implemented by a boom hydraulic cylinder 22, an arm hydraulic cylinder 23 and a bucket hydraulic cylinder 24, respectively.

The cab 6 is provided with a cab seat (seat) 25 on which the operator is seated. Left and right travel control levers 26A and 26B (only the left travel control lever 26A is shown in FIG. 1) operable forward and backward with hands or feet to command the operation of the left and right travel hydraulic motors 13A and 13B are arranged in front of the cab seat 25. On the floor to the right of the right travel control lever 26B, a swing control pedal (unshown) to be operated left and right for commanding the operation of the swing hydraulic cylinder 18 is arranged.

Arranged to the left of the cab seat 25 is an arm/rotation control lever 27A of the cross-hair four-way operation, which is operable forward and backward to command the operation of the arm hydraulic cylinder 23 and operable left and right to command the operation of the rotation hydraulic motor 17. Arranged to the right of the cab seat 25 is a boom/bucket control lever 27B (see FIG. 3 which will be explained later) of the cross-hair four-way operation, which is operable forward and backward to command the operation of the boom hydraulic cylinder 22 and operable left and right to command the operation of the bucket hydraulic cylinder 24. A blade control lever (unshown) operable forward and backward to command the operation of the blade hydraulic cylinder 15 is also arranged to the right of the cab seat 25.

Figure 2:
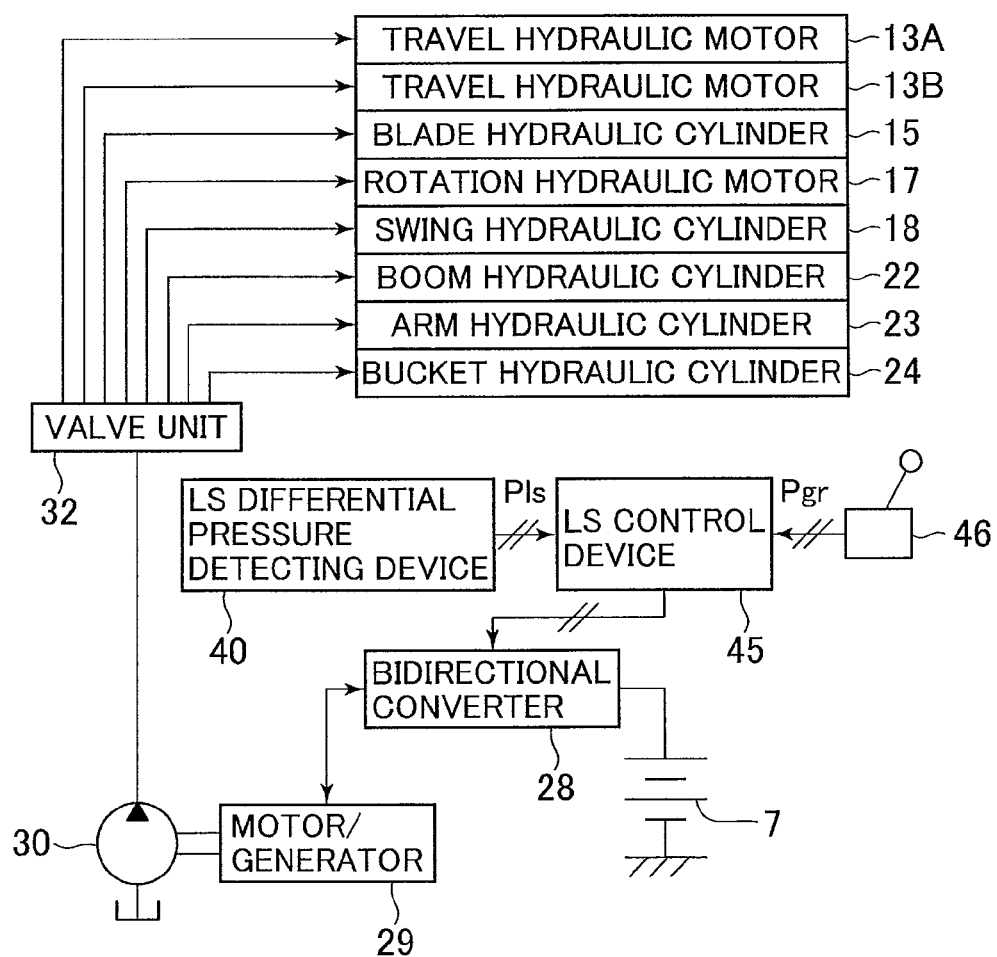
FIG. 2 is a schematic diagram showing the configuration of an electric drive unit in accordance with a first embodiment of the present invention.
Figure 3:
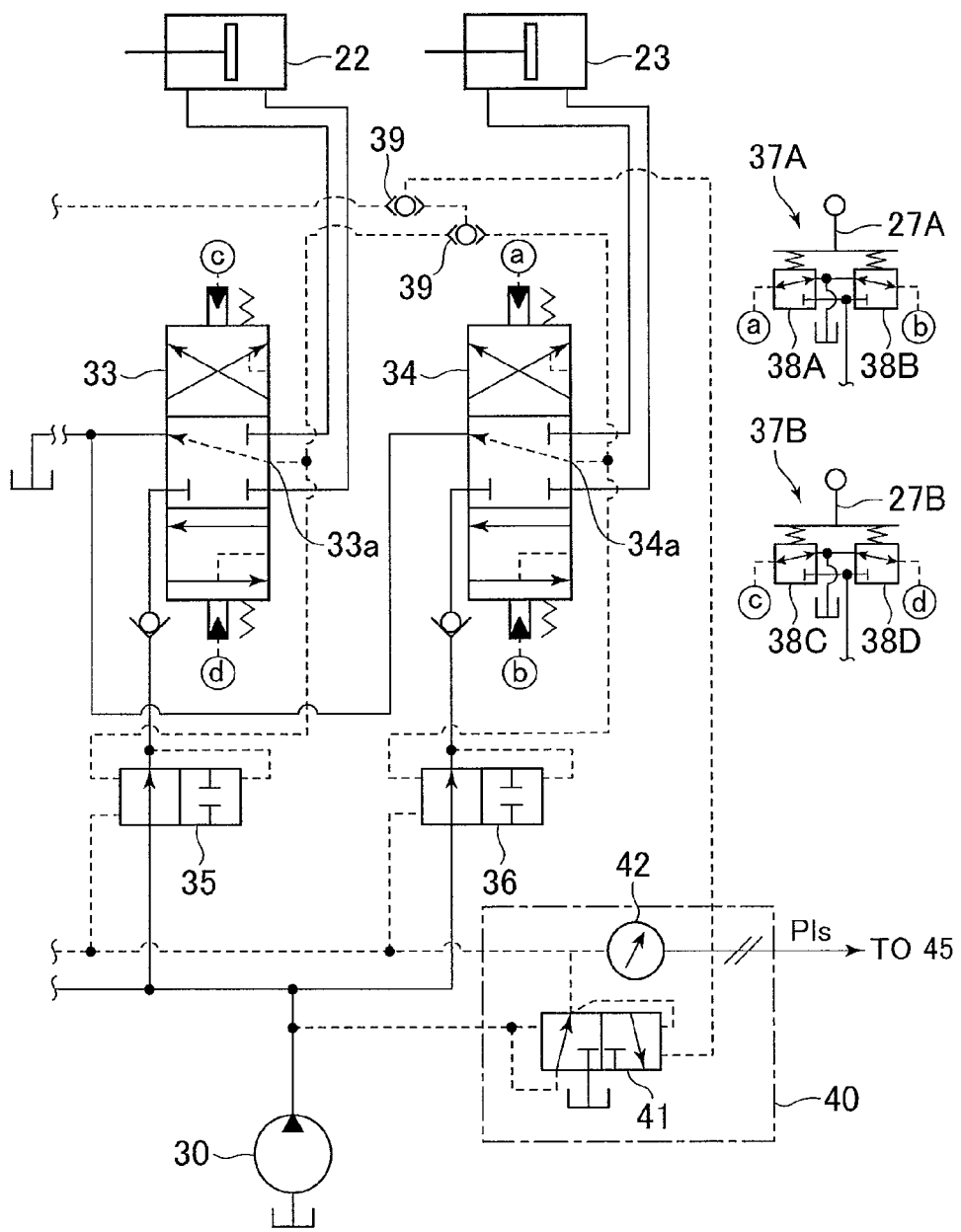
FIG. 3 is a schematic diagram showing a configuration related to the driving of a boom hydraulic cylinder and an arm hydraulic cylinder (as a typical example of a configuration included in the electric drive unit shown in FIG. 2) as well as the configuration of an LS differential pressure detecting device.

FIG. 2 is a schematic diagram showing the configuration of an electric drive unit in accordance with this embodiment which is installed in the above-described electric mini-excavator. FIG. 3 is a hydraulic circuit diagram showing a configuration related to the driving of the boom hydraulic cylinder 22 and the arm hydraulic cylinder 23 (as a typical example of a configuration included in the electric drive unit shown in FIG. 2) as well as the configuration of an LS differential pressure detecting device.

Referring to FIGS. 2 and 3, the electric drive unit comprises the electricity storage device 7, a motor/generator 29, a hydraulic pump 30, a pilot pump (unshown), a plurality of hydraulic actuators, and a valve unit 32. The electricity storage device 7 is made up of a plurality of batteries. While only two batteries are shown in FIG. 2 for the sake of convenience, the actual electricity storage device 7 includes a greater number of batteries. The motor/generator 29 supplies and receives electric power to/from the electricity storage device 7 via a bidirectional converter 28. The hydraulic pump 30 (fixed displacement type) and the pilot pump (fixed displacement type) are driven by the motor/generator 29. The plurality of hydraulic actuators include the left and right travel hydraulic motors 13A and 13B, the blade hydraulic cylinder 15, the rotation hydraulic motor 17, the swing hydraulic cylinder 18, the boom hydraulic cylinder 22, the arm hydraulic cylinder 23 and the bucket hydraulic cylinder 24 which have been explained above. These hydraulic actuators will hereinafter be referred to as "the hydraulic actuators 22, 23, etc." The valve unit 32 controls the flow of the hydraulic fluid supplied from the hydraulic pump 30 to the hydraulic actuators 22, 23, etc.

The valve unit 32 includes a plurality of directional control valves of the closed center type for controlling the direction and the flow rate of the hydraulic fluid supplied from the hydraulic pump 30 to the hydraulic actuators 22, 23, etc. Specifically, the plurality of directional control valves include a boom directional control valve 33 and an arm directional control valve 34 which are shown in FIG. 3 and a right travel directional control valve, a left travel directional control valve, a blade directional control valve, a rotation directional control valve, a swing directional control valve and a bucket directional control valve which are not shown in FIG. 3. These directional control valves will hereinafter be referred to as "the directional control valves 33, 34, etc." The valve unit 32 further includes a plurality of pressure compensating valves arranged upstream of the directional control valves 33, 34, etc. Specifically, the plurality of pressure compensating valves include a boom pressure compensating valve 35 and an arm pressure compensating valve 36 which are shown in FIG. 3 and a right travel pressure compensating valve, a left travel pressure compensating valve, a blade pressure compensating valve, a rotation pressure compensating valve, a swing pressure compensating valve and a bucket pressure compensating valve which are not shown in FIG. 3. These pressure compensating valves will hereinafter be referred to as "the pressure compensating valves 35, 36, etc."

The arm directional control valve 34 is remote controlled by pilot pressure supplied from an operating device 37A. Specifically, the operating device 37A includes the aforementioned arm/rotation control lever 27A, a pair of pressure reducing valves 38A and 38B for generating pilot pressure according to the operator's forward/backward operation on the control lever 27A by use of the delivery pressure of the pilot pump as the source pressure, and a pair of pressure reducing valves (unshown) for generating pilot pressure according to the operator's left and right operation on the control lever 27A by use of the delivery pressure of the pilot pump as the source pressure. When the control lever 27A is operated forward from its neutral position, for example, the pilot pressure generated by the pressure reducing valve 38A according to the operation amount of the control lever 27A is outputted to a pressure receiving part (upper part in FIG. 3) of the arm directional control valve 34, by which the arm directional control valve 34 is switched to an upper switch position in FIG. 3. Consequently, the hydraulic fluid from the hydraulic pump 30 is supplied to the rod side of the arm hydraulic cylinder 23, contracts the arm hydraulic cylinder 23, and thereby rotates the arm 20 downward. In contrast, when the control lever 27A is operated backward from the neutral position, the pilot pressure generated by the pressure reducing valve 38B according to the operation amount of the control lever 27A is outputted to a pressure receiving part (lower part in FIG. 3) of the arm directional control valve 34, by which the arm directional control valve 34 is switched to a lower switch position in FIG. 3. Consequently, the hydraulic fluid from the hydraulic pump 30 is supplied to the bottom side of the arm hydraulic cylinder 23, expands the arm hydraulic cylinder 23, and thereby rotates the arm 20 upward.

The boom directional control valve 33 is remote controlled by pilot pressure supplied from an operating device 37B. Specifically, the operating device 37B includes the aforementioned boom/bucket control lever 27B, a pair of pressure reducing valves 38C and 38D for generating pilot pressure according to the operator's forward/backward operation on the control lever 27B by use of the delivery pressure of the pilot pump as the source pressure, and a pair of pressure reducing valves (unshown) for generating pilot pressure according to the operator's left and right operation on the control lever 27B by use of the delivery pressure of the pilot pump as the source pressure. When the control lever 27B is operated forward from its neutral position, for example, the pilot pressure generated by the pressure reducing valve 38C according to the operation amount of the control lever 27B is outputted to a pressure receiving part (upper part in FIG. 3) of the boom directional control valve 33, by which the boom directional control valve 33 is switched to an upper switch position in FIG. 3. Consequently, the hydraulic fluid from the hydraulic pump 30 is supplied to the rod side of the boom hydraulic cylinder 22, contracts the boom hydraulic cylinder 22, and thereby rotates the boom 19 downward. In contrast, when the control lever 27B is operated backward from the neutral position, the pilot pressure generated by the pressure reducing valve 38D according to the operation amount of the control lever 27B is outputted to a pressure receiving part (lower part in FIG. 3) of the boom directional control valve 33, by which the boom directional control valve 33 is switched to a lower switch position in FIG. 3. Consequently, the hydraulic fluid from the hydraulic pump 30 is supplied to the bottom side of the boom hydraulic cylinder 22, expands the boom hydraulic cylinder 22, and thereby rotates the boom 19 upward.

In this embodiment, the configuration related to the left and right travel hydraulic motors 13A and 13B, the blade hydraulic cylinder 15, the rotation hydraulic motor 17, the swing hydraulic cylinder 18 and the bucket hydraulic cylinder 24 is substantially equivalent to the above-described configuration related to the driving of the boom hydraulic cylinder 22 and the arm hydraulic cylinder 23. In short, each of the right travel directional control valve, the left travel directional control valve, the blade directional control valve, the rotation directional control valve, the swing directional control valve and the bucket directional control valve is remote controlled by pilot pressure supplied from a corresponding operating device (unshown).

The directional control valves 33, 34, etc. have load ports 33a, 34a, etc. each of which is used for extracting load pressure of the corresponding hydraulic actuator when the valve is switched (which equals the tank pressure when the valve is at its neutral position). A plurality of (seven in this embodiment, only two are shown in FIG. 3) load pressure shuttle valves 39 are provided for selecting and extracting the highest load pressure Plmax from the load pressures outputted from the load ports 33a, 34a, etc. (hereinafter referred to as "the maximum load pressure Plmax of the hydraulic actuators 22, 23, etc."). Further, an LS differential pressure detecting device 40 is provided for detecting load sensing differential pressure Pls (hereinafter referred to as "the LS differential pressure Pls") as the differential pressure between the delivery pressure Ps of the hydraulic pump 30 and the maximum load pressure Plmax of the hydraulic actuators 22, 23, etc.

In this embodiment, the LS differential pressure detecting device 40 is made up of a differential pressure detecting valve 41 for generating pressure corresponding to the LS differential pressure Pls by use of the delivery pressure Ps of the hydraulic pump 30 as the source pressure and a pressure sensor 42 for measuring the output pressure of the differential pressure detecting valve 41 (i.e., the LS differential pressure Pls). The differential pressure detecting valve 41 has a pressure receiving part for introducing the delivery pressure Ps of the hydraulic pump 30 and having the delivery pressure Ps act on the pressure boosting side, a pressure receiving part for introducing the maximum load pressure Plmax of the hydraulic actuators 22, 23, etc. from the shuttle valves 39 and having the maximum load pressure Plmax act on the pressure reducing side, and a pressure receiving part for introducing the output pressure of the differential pressure detecting valve 41 itself and having the output pressure act on the pressure reducing side. With such a configuration, the differential pressure detecting valve 41 generates and outputs the pressure corresponding to the LS differential pressure Pls. The pressure sensor 42 measures the output pressure of the differential pressure detecting valve 41 and outputs an electric signal representing the measured output pressure.

Each of the pressure compensating valves 35, 36, etc. has a pressure receiving part for introducing upstream-side pressure of the corresponding directional control valve and having the upstream-side pressure act on the valve closing side, a pressure receiving part for introducing downstream-side pressure of the corresponding directional control valve (specifically, output pressure of the load port) and having the downstream-side pressure act on the valve opening side, and a pressure receiving part for introducing the LS differential pressure Pls from the differential pressure detecting valve 41 and having the LS differential pressure Pls act on the valve opening side. With this configuration, differential pressure across every one of the directional control valves 33, 34, etc. is controlled to be equal to the LS differential pressure Pls. Consequently, in the combined operation in which two or more hydraulic actuators are simultaneously driven, for example, the hydraulic fluid is distributed according to a ratio corresponding to the opening areas of the directional control valves irrespective of the magnitudes of the load pressures of the hydraulic actuators.

Further, a load sensing control device 45 (hereinafter referred to as "the LS control device 45") for controlling the bidirectional converter 28 is provided. The LS control device 45 performs the variable control on the revolution speed of the motor/generator 29 via the bidirectional converter 28 so that the LS differential pressure Pls detected by the LS differential pressure detecting device 40 equals a preset target value Pgr. In this embodiment, an input device 46 allowing for modification of the target value Pgr of the LS differential pressure is provided. The operating speeds of the hydraulic actuators can be changed by the modification of the target value Pgr of the LS differential pressure.

Figure 4:
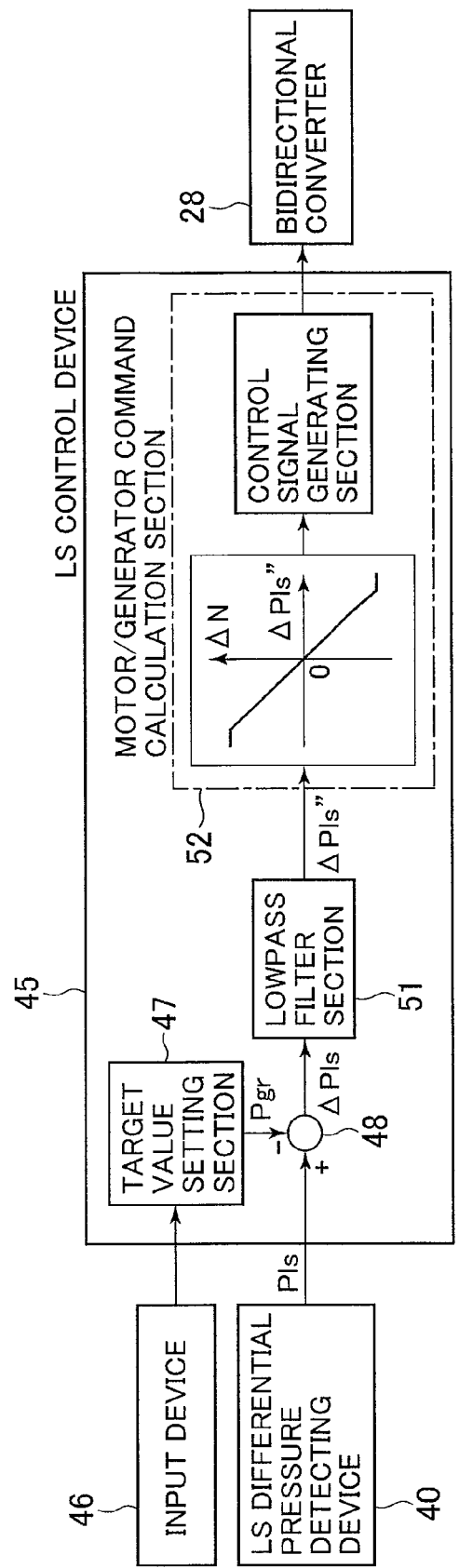
FIG. 4 is a block diagram showing the functional configuration of an LS control device (shown in FIG. 2) together with related devices.

The details of the LS control device 45 will be explained below referring to FIG. 4. FIG. 4 is a block diagram showing the functional configuration of the LS control device 45 together with related devices.

The LS control device 45 includes a target value setting section 47, a subtraction section 48, a lowpass filter section 51 and a motor/generator command calculation section 52. The target value setting section 47 sets the target value Pgr of the LS differential pressure which is inputted from the input device 46. The subtraction section 48 calculates the difference ΔPls between the LS differential pressure Pls inputted from the pressure sensor 42 of the LS differential pressure detecting device 40 and the target value Pgr set by the target value setting section 47. The lowpass filter section 51 performs lowpass filter processing (with a cutoff frequency f) on the difference ΔPls calculated by the subtraction section 48. The motor/generator command calculation section 52 performs a prescribed calculation process on the difference ΔPls after undergoing the processing by the lowpass filter section 51 (difference ΔPls"), thereby generates a control signal, and outputs the control signal to the bidirectional converter 28.

Figure 5A:
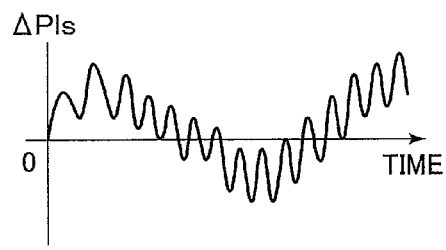
FIG. 5A is a graph for explaining processing by a lowpass filter section shown in FIG. 4 (temporal change of a difference ΔPls before the processing).
Figure 5B:
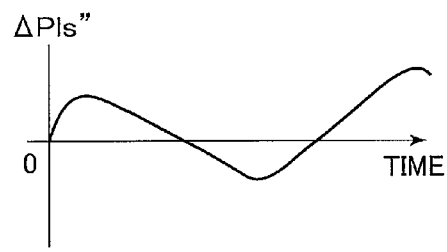
FIG. 5B is a graph for explaining the processing by the lowpass filter section shown in FIG. 4 (temporal change of a difference ΔPls" after the processing).

The processing by the lowpass filter section 51 will be explained concretely referring to FIGS. 5A and 5B. The difference ΔPls calculated by the subtraction section 48 is assumed here to change with time like the composite waveform shown in FIG. 5A dominated by two frequencies fa and fb (fa>f>fb). Since the lowpass filter section 51 performs the processing on the difference ΔPls calculated by the subtraction section 48 so as to remove components changing above the frequency f, the difference ΔPls" after the processing changes with time like the waveform shown in FIG. 5B dominated by the frequency fb.

The motor/generator command calculation section 52 has prestored a calculation table which has been set so that a revolution speed difference ΔN of the motor/generator 29 decreases from 0 with the increase in the LS differential pressure difference ΔPls" from 0 and the revolution speed difference ΔN of the motor/generator 29 increases from 0 with the decrease in the LS differential pressure difference ΔPls" from 0 as shown in FIG. 4, for example. Based on the calculation table, the revolution speed difference ΔN of the motor/generator 29 is calculated from the LS differential pressure difference ΔPls" after the processing by the lowpass filter section 51. A revolution speed command value of this time is calculated by adding the difference ΔN to the revolution speed command value of the previous time (or an actual value of the revolution speed calculated by the bidirectional converter 28 from the magnitude and the phase of the drive current of the motor/generator 29, for example). A control signal corresponding to the calculated revolution speed command value is generated and outputted to the bidirectional converter 28.

In this embodiment, the motor/generator command calculation section 52 has prestored the lower limit and the upper limit of the revolution speed of the motor/generator 29 and limits the aforementioned revolution speed command value with the lower limit and the upper limit. By the limitation, the delivery pressure of the pilot pump (i.e., the source pressure of the pilot pressure in each of the operating devices 37A, 37B, etc.) is secured.

Figure 6:
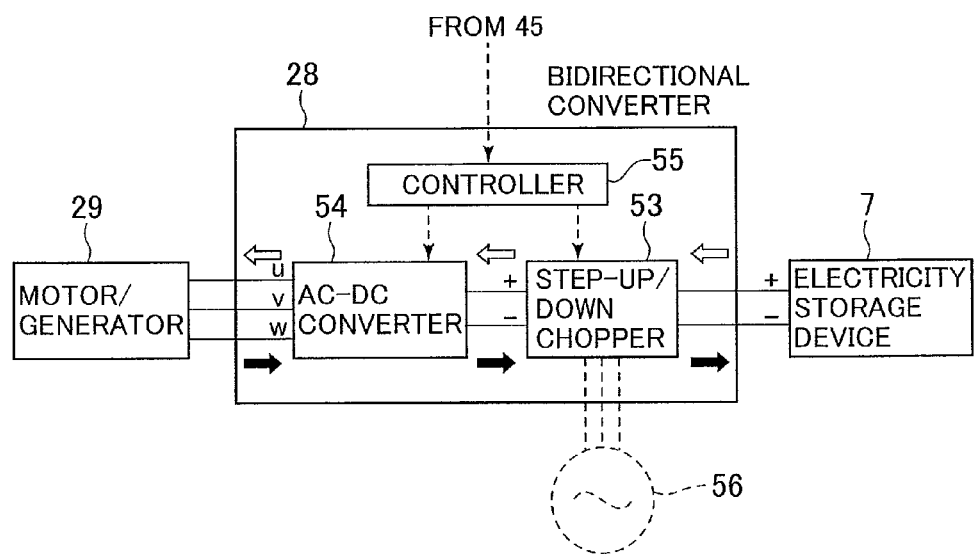
FIG. 6 is a block diagram showing the functional configuration of a bidirectional converter (shown in FIG. 2) together with related devices.

The details of the bidirectional converter 28 will be explained below referring to FIG. 6. FIG. 6 is a block diagram showing the functional configuration of the bidirectional converter 28 together with related devices.

The bidirectional converter 28 includes a step-up/down chopper 53, an AC-DC converter 54 and a controller 55. Although details are not illustrated, the step-up/down chopper 53 includes a step-up circuit, a step-down circuit, a rectification circuit, and switches arranged between the circuits. The controller 55 receives the control signal from the LS control device 45 (i.e., the revolution speed command value), etc. and controls the step-up/down chopper 53 and the AC-DC converter 54 according to the revolution speed command value. Specifically, when the revolution speed of the motor/generator 29 should be increased or maintained (i.e., when the LS differential pressure difference $\Delta Pls''\leq 0$), the controller 55 outputs drive commands for making the motor/generator 29 operate as the motor to the step-up/down chopper 53 and the AC-DC converter 54. Accordingly, the step-up/down chopper 53 boosts the voltage of the DC power from the electricity storage device 7 and supplies the DC power with the boosted voltage to the AC-DC converter 54. The AC-DC converter 54 generates AC power based on the DC power supplied from the step-up/down chopper 53, applies the AC power to the motor/generator 29 and thereby drives the motor/generator 29. In contrast, when the revolution speed of the motor/generator 29 should be decreased (i.e., when the LS differential pressure difference $\Delta Pls''>0$), the controller 55 outputs regeneration commands for making the motor/generator 29 operate as the generator (regeneration brake) to the step-up/down chopper 53 and the AC-DC converter 54. Accordingly, the AC-DC converter 54 converts the inertial force of the rotor of the motor/generator 29 into AC power and converts the AC power into DC power. The step-up/down chopper 53 boosts the voltage of the DC power from the AC-DC converter 54, supplies the DC power with the boosted voltage to the electricity storage device 7, and thereby charges the electricity storage device 7.

The bidirectional converter 28 is designed to interface between the electricity storage device 7 and a commercial power supply 56 when a cable from the commercial power supply 56 (external power supply) is connected to the power supply socket. Further, a charging switch (unshown) is provided to allow for commanding the starting/ending of the charging from the external power supply while the motor/generator 29 is halted. The controller 55 outputs a charging command to the step-up/down chopper 53 in response to a charging start command signal from the charging switch. Accordingly, the step-up/down chopper 53 converts the AC power from the commercial power supply 56 into DC power while lowering its voltage, supplies the DC power to the electricity storage device 7, and thereby charges the electricity storage device 7.

In the configuration described above, the operating devices 37A, 37B, etc. constitute a plurality of operating means (described in CLAIMS) which command the operation of a plurality of hydraulic actuators. The bidirectional converter 28 constitutes motor/generator control means which performs the variable control on the revolution speed of the motor/generator. The LS differential pressure detecting device 40 constitutes differential pressure detecting means which detects the load sensing differential pressure. The LS control device 45 constitutes command control means which calculates a command value for the motor/generator control means according to the change in a demanded flow rate determined based on operation command levels from the plurality of operating means, while also constituting command control means which calculates a command value for the motor/generator control means according to the difference between the load sensing differential pressure detected by the differential pressure detecting means and a preset target value so that the load sensing differential pressure equals the target value.

Next, the operation and effect of this embodiment will be explained below.

When the operator returns a control lever being operated alone to the neutral position, the corresponding directional control valve is returned to its neutral position and the demanded flow rate decreases. Accordingly, the delivery pressure Ps of the hydraulic pump 30 increases and the maximum load pressure Plmax of the hydraulic actuators 22, 23, etc. decreases, and consequently, the LS differential pressure Pls exceeds the target value Pgr. Then, the LS control device 45 decreases the revolution speed of the motor/generator 29 via the bidirectional converter 28 so that the LS differential pressure Pls equals the target value Pgr (i.e., so that the delivery flow rate of the hydraulic pump 30 matches with the demanded flow rate). In this case, the bidirectional converter 28 performs regeneration control for converting the inertial force of the rotor of the motor/generator 29 into electric power and thereby charging the electricity storage device 7. Therefore, the operating time of the mini-excavator can be increased through the charging of the electricity storage device 7.

As a method for increasing the electric power acquired by the regeneration control by the bidirectional converter 28, it is possible to increase the inertial force of the rotor of the motor/generator 29 by increasing the mass of the rotor, for example. In this case, however, responsiveness of the variable control of the revolution speed of the motor/generator 29 is deteriorated. To avoid this problem, in the LS control device 45 in this embodiment, the lowpass filter section 51 performs the processing for removing the components changing above the frequency f on the difference $\Delta Pls$ between the LS differential pressure Pls and the target value Pgr before the motor/generator command calculation section 52 performs the calculation on the difference $\Delta Pls$. By the processing, sensitivity (susceptibility) of the variable control of the revolution speed of the motor/generator 29 to fluctuations in the LS differential pressure Pls can be reduced. Consequently, the hunting can be suppressed.

Figure 7:
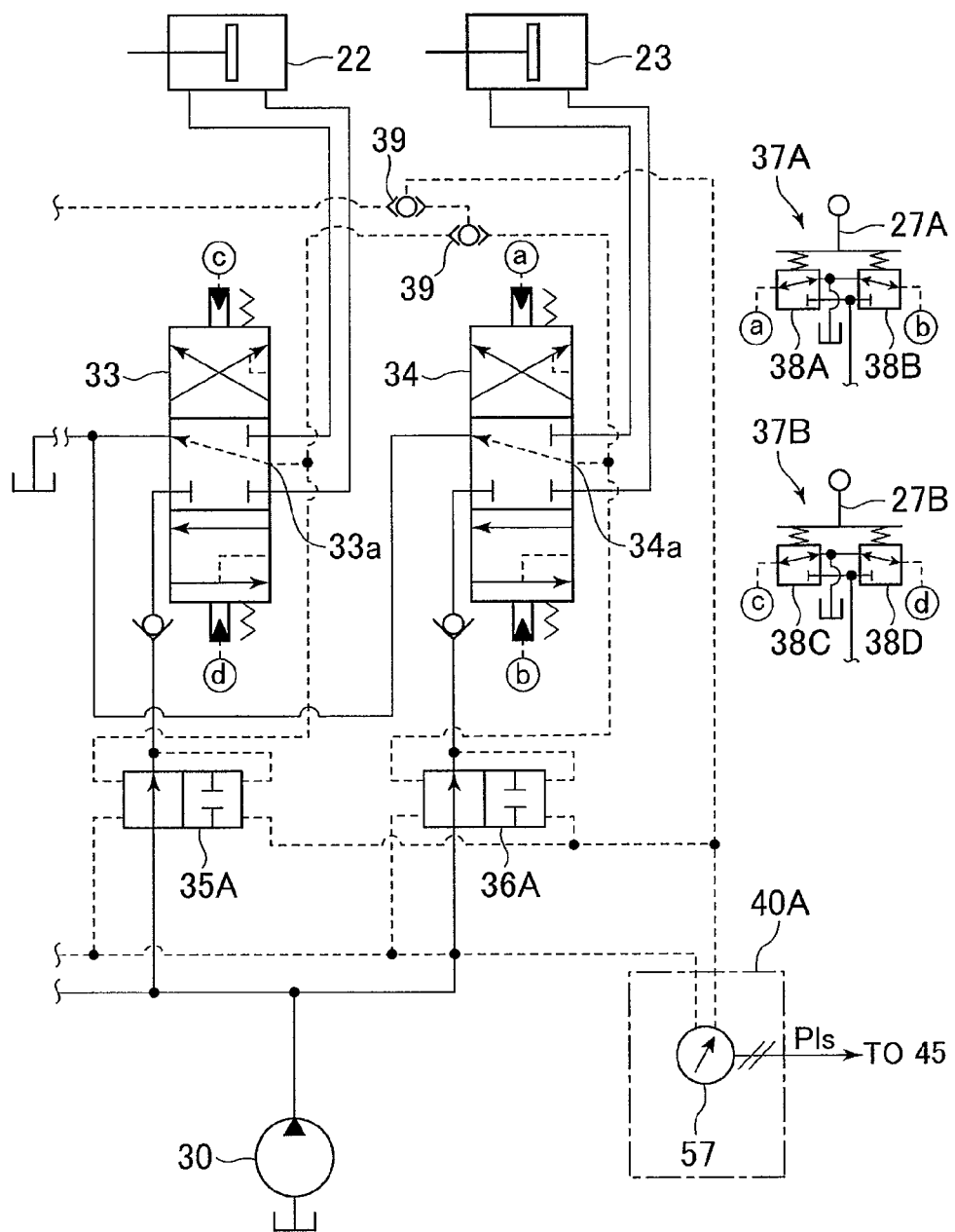
FIG. 7 is a schematic diagram showing the configuration of an LS differential pressure detecting device in accordance with a first modification of the present invention.

Incidentally, while the LS differential pressure detecting device 40 implemented by the differential pressure detecting valve 41 and the pressure sensor 42 is employed in the above explanation of the first embodiment, the configuration of the LS differential pressure detecting device is not restricted to this example. For example, an LS differential pressure detecting device 40A implemented by a differential pressure sensor 57 may also be employed as in a first modification shown in FIG. 7. The differential pressure sensor 57 receives the delivery pressure Ps of the hydraulic pump 30 while also receiving the maximum load pressure Plmax of the hydraulic actuators 22, 23, etc. from the shuttle valves 39, measures the LS differential pressure Pls as differential pressure between the delivery pressure Ps and the maximum load pressure Plmax, and outputs an electric signal representing the LS differential pressure Pls to the LS control device 45. Also in this modification, effects equivalent to those of the above-described first embodiment can be achieved.

Figure 8:
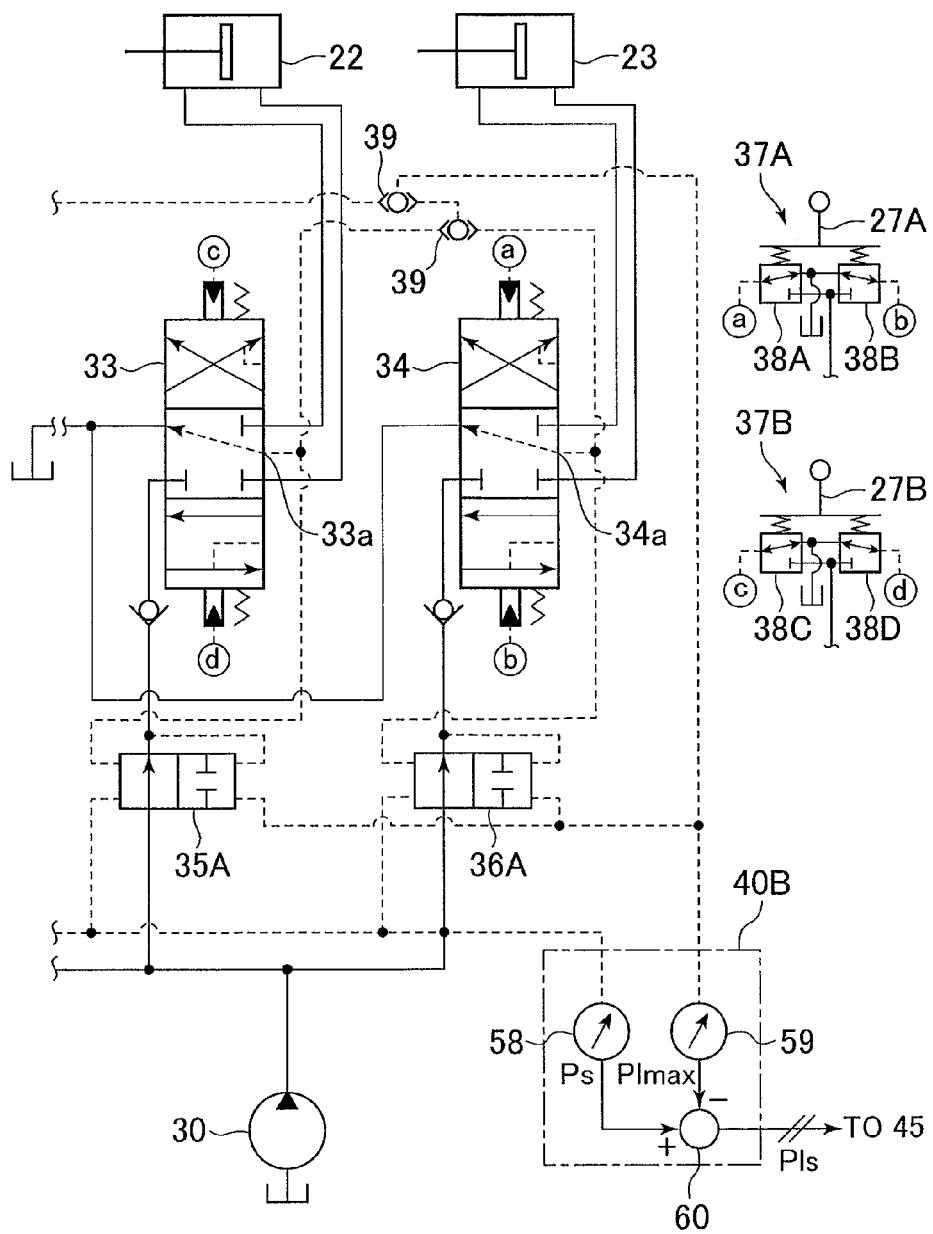
FIG. 8 is a schematic diagram showing the configuration of an LS differential pressure detecting device in accordance with a second modification of the present invention.

Further, an LS differential pressure detecting device 40B implemented by a delivery pressure sensor 58, a maximum load pressure sensor 59 and a subtractor 60 may also be employed as in a second modification shown in FIG. 8. The delivery pressure sensor 58 receives and measures the delivery pressure Ps of the hydraulic pump 30 and outputs an electric signal representing the delivery pressure Ps. The maximum load pressure sensor 59 measures the maximum load pressure Plmax of the hydraulic actuators 22, 23, etc. received from the shuttle valves 39 and outputs an electric signal representing the maximum load pressure Plmax. The subtractor 60 calculates the LS differential pressure Pls as the differential pressure between the delivery pressure Ps of the hydraulic pump 30 inputted from the delivery pressure sensor 58 and the maximum load pressure Plmax inputted from the maximum load pressure sensor 59 and outputs an electric signal representing the LS differential pressure Pls to the LS control device 45. Incidentally, it is also possible to provide the subtractor 60 not as a component of the LS differential pressure detecting device but as a component of the LS control device. Also in this modification, effects equivalent to those of the above-described first embodiment can be achieved.

Figure 9:
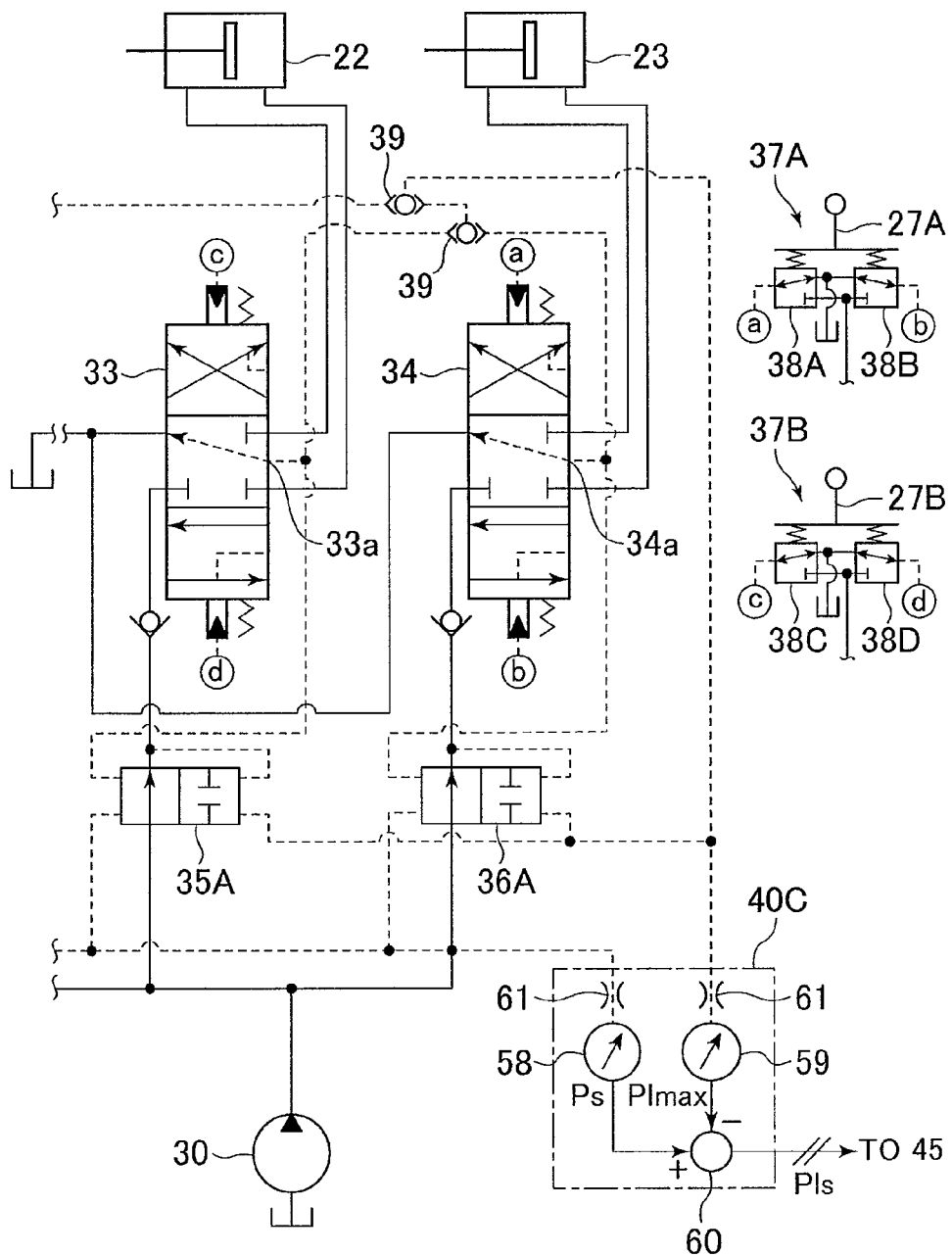
FIG. 9 is a schematic diagram showing the configuration of an LS differential pressure detecting device in accordance with a third modification of the present invention.

It is also possible, as in a third modification shown in FIG. 9, to provide restrictors 61 on the hydraulic pressure introducing side of the delivery pressure sensor 58 and the maximum load pressure sensor 59 while employing an LS differential pressure detecting device 40C configured similarly to the LS differential pressure detecting device 40B. In other words, fluctuations in the values detected by the sensors may be suppressed by providing the sensors with the restrictors 61. Also in this modification, effects equivalent to those of the above-described first embodiment can be achieved.

In the first through third modifications described above, the differential pressure detecting valve 41 for outputting the pressure corresponding to the LS differential pressure Pls is not employed. Therefore, each of the pressure compensating valves 35A, 36A, etc. has a pressure receiving part for introducing upstream-side pressure of the corresponding directional control valve and having the upstream-side pressure act on the valve closing side, a pressure receiving part for introducing downstream-side pressure of the corresponding directional control valve (specifically, the output pressure of the load port) and having the downstream-side pressure act on the valve opening side, a pressure receiving part for introducing the delivery pressure Ps of the hydraulic pump 30 and having the delivery pressure Ps act on the valve opening side, and a pressure receiving part for introducing the maximum load pressure Plmax of the hydraulic actuators from the shuttle valves 39 and having the maximum load pressure Plmax act on the valve closing side.

A second embodiment of the present invention will be described below referring to FIGS. 10 and 11. This embodiment is an embodiment of performing load sensing control according to a control procedure different from that in the first embodiment. In this embodiment, components equivalent to those in the first embodiment or the modifications are assigned the already used reference characters and repeated explanation thereof is omitted properly.

Figure 10:
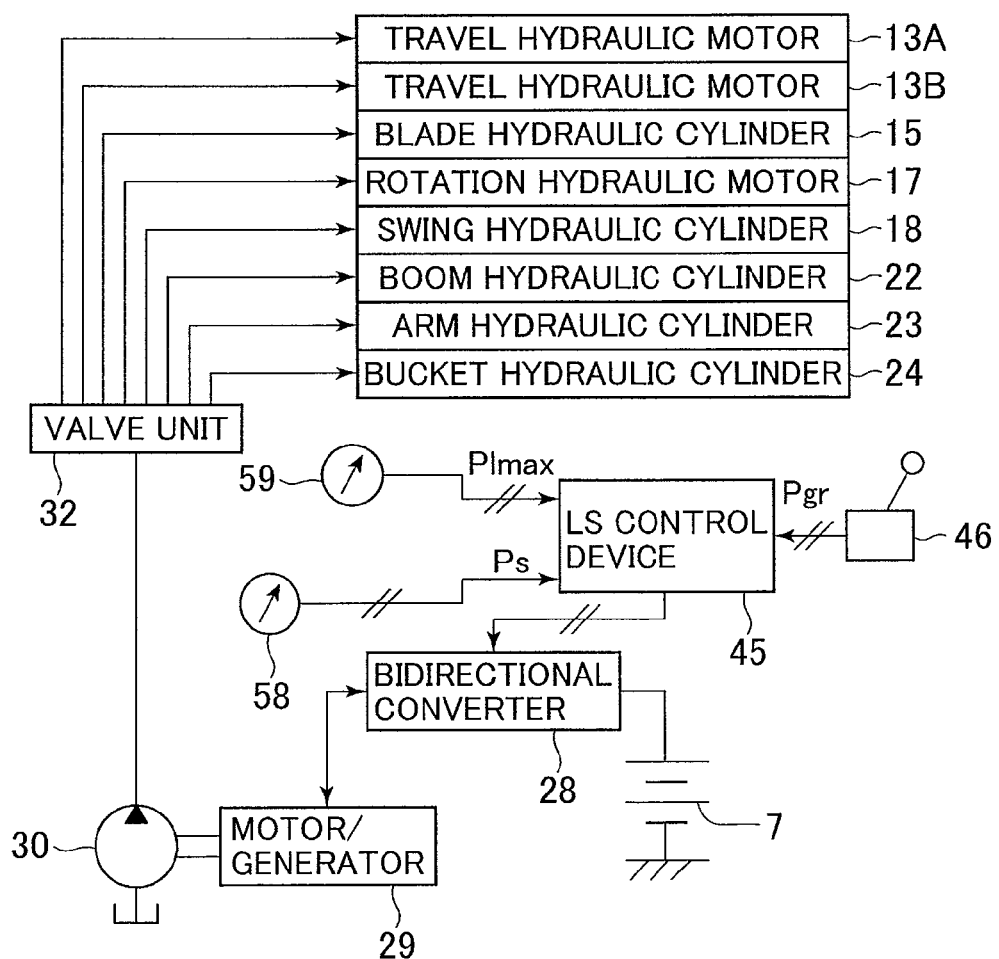
FIG. 10 is a schematic diagram showing the configuration of an electric drive unit in accordance with a second embodiment of the present invention.

FIG. 10 is a schematic diagram showing the configuration of an electric drive unit in accordance with this embodiment.

The electric drive unit of this embodiment is equipped with the delivery pressure sensor 58 and the maximum load pressure sensor 59 similarly to the second or third modification described above. An LS control device 45A adds the preset target value Pgr of the LS differential pressure to the maximum load pressure Plmax of the hydraulic actuators 22, 23, etc. detected by the maximum load pressure sensor 59 and sets the sum as a target value Ps0 of the delivery pressure of the hydraulic pump 30. The LS control device 45A also performs variable control on the revolution speed of the motor/generator 29 via the bidirectional converter 28 so that the delivery pressure Ps of the hydraulic pump 30 detected by the delivery pressure sensor 58 equals the target value Ps0.

The details of the LS control device 45A will be explained below referring to FIG. 11. FIG. 11 is a block diagram showing the functional configuration of the LS control device 45A together with related devices.

The LS control device 45A includes a target value setting section 47A, a subtraction section 48A, a lowpass filter section 51A and a motor/generator command calculation section 52A. The target value setting section 47A sets the target value Ps0 of the delivery pressure of the hydraulic pump 30. The subtraction section 48A calculates the difference ΔPs between the delivery pressure Ps of the hydraulic pump 30 inputted from the delivery pressure sensor 58 and the target value Ps0 set by the target value setting section 47A. The lowpass filter section 51A performs lowpass filter processing (with a cutoff frequency f) on the difference ΔPs calculated by the subtraction section 48A. The motor/generator command calculation section 52A performs a prescribed calculation process on the difference ΔPs" after undergoing the processing by the lowpass filter section 51A, thereby generates a control signal, and outputs the control signal to the bidirectional converter 28.

The target value setting section 47A first sets the target value Pgr of the LS differential pressure which is inputted from the input device 46. Then, the target value setting section 47A adds the target value Pgr of the LS differential pressure to the maximum load pressure Plmax of the hydraulic actuators 22, 23, etc. inputted from the maximum load pressure sensor 59 and sets the sum as the target value Ps0 of the delivery pressure of the hydraulic pump 30.

Figure 11:
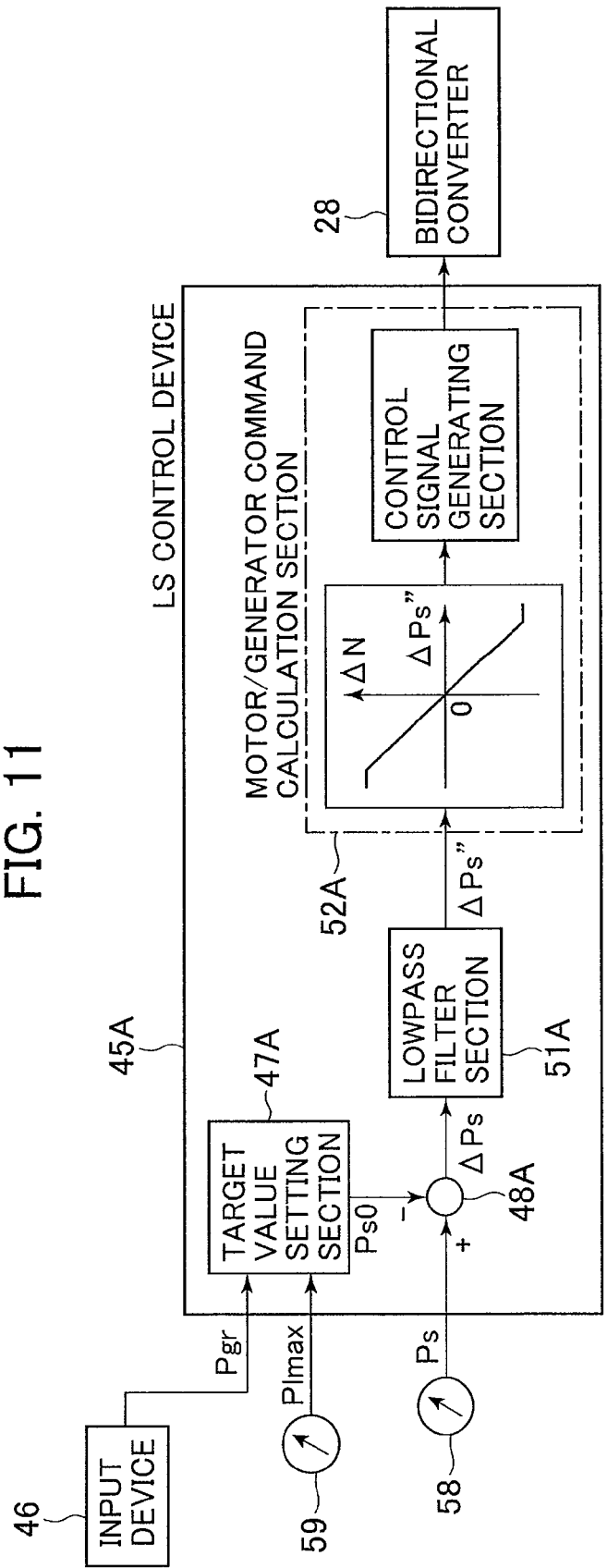
FIG. 11 is a block diagram showing the functional configuration of an LS control device (shown in FIG. 10) together with related devices.

The motor/generator command calculation section 52A has prestored a calculation table which has been set so that the revolution speed difference ΔN of the motor/generator 29 decreases from 0 with the increase in the delivery pressure difference ΔPs" of the hydraulic pump 30 from 0 and the revolution speed difference ΔN of the motor/generator 29 increases from 0 with the decrease in the delivery pressure difference ΔPs" of the hydraulic pump 30 from 0 as shown in FIG. 11, for example. Based on the calculation table, the revolution speed difference ΔN of the motor/generator 29 is calculated from the delivery pressure difference ΔPs" of the hydraulic pump 30 after the processing by the lowpass filter section 51A. A revolution speed command value of this time is calculated by adding the difference ΔN to the revolution speed command value of the previous time (or an actual value of the revolution speed calculated by the bidirectional converter 28 from the magnitude and the phase of the drive current of the motor/generator 29, for example). A control signal corresponding to the calculated revolution speed command value is generated and outputted to the bidirectional converter 28.

Similarly to the motor/generator command calculation section 52 in the first embodiment, the motor/generator command calculation section 52A has prestored the lower limit and the upper limit of the revolution speed of the motor/generator 29 and limits the aforementioned revolution speed command value with the lower limit and the upper limit. By the limitation, the delivery pressure of the pilot pump (i.e., the source pressure of the pilot pressure in each of the operating devices 37A, 37B, etc.) is secured.

Similarly to the first embodiment, the bidirectional converter 28 makes the motor/generator 29 operate as the motor when the revolution speed of the motor/generator 29 should be increased or maintained (specifically, when the delivery pressure difference ΔPs" of the hydraulic pump 30≦0). In contrast, when the revolution speed of the motor/generator 29 should be decreased (specifically, when the delivery pressure difference ΔPs" of the hydraulic pump 30>0), the bidirectional converter 28 makes the motor/generator 29 operate as the generator (regeneration brake).

In the configuration described above, the delivery pressure sensor 58 constitutes delivery pressure detecting means (described in CLAIMS) which detects the delivery pressure of the hydraulic pump. The maximum load pressure sensor 59 constitutes maximum load pressure detecting means which detects the maximum load pressure of the hydraulic actuators. The LS control device 45A constitutes command control means which calculates a command value for the motor/generator control means according to the change in a demanded flow rate determined based on operation command levels from the plurality of operating means, while also constituting command control means which sets a target value for the delivery pressure of the hydraulic pump based on the maximum load pressure of the hydraulic actuators detected by the maximum load pressure detecting means and calculates a command value for the motor/generator control means according to the difference between the delivery pressure of the hydraulic pump detected by the delivery pressure detecting means and the target value so that the delivery pressure of the hydraulic pump equals the target value.

Next, the operation and effect of this embodiment will be explained below.

When the operator returns a control lever being operated alone to the neutral position, the corresponding directional control valve is returned to its neutral position and the demanded flow rate decreases. Accordingly, the delivery pressure Ps of the hydraulic pump 30 increases, the maximum load pressure Plmax of the hydraulic actuators 22, 23, etc. decreases, the target value Ps0 of the delivery pressure also decreases, and consequently, the delivery pressure Ps exceeds the target value Ps0. Then, the LS control device 45A decreases the revolution speed of the motor/generator 29 via the bidirectional converter 28 so that the delivery pressure Ps of the hydraulic pump 30 equals the target value Ps0 (i.e., so that the delivery flow rate of the hydraulic pump 30 matches with the demanded flow rate). In this case, the bidirectional converter 28 performs regeneration control for converting the inertial force of the rotor of the motor/generator 29 into electric power and thereby charging the electricity storage device 7. Therefore, the operating time of the mini-excavator can be increased through the charging of the electricity storage device 7.

Further, in the LS control device 45A in this embodiment, the lowpass filter section 51A performs the processing for removing the components changing above the frequency f on the difference ΔPs between the delivery pressure Ps of the hydraulic pump 30 and the target value Ps0 before the motor/generator command calculation section 52A performs the calculation on the difference ΔPs. By the processing, sensitivity (susceptibility) of the variable control of the revolution speed of the motor/generator 29 to fluctuations in the delivery pressure Ps of the hydraulic pump 30 (i.e., fluctuations in the LS differential pressure Pls) can be reduced. Consequently, the hunting can be suppressed.

Although not explained particularly in the above second embodiment, the LS control device 45A may further include a lowpass filter section which performs processing for removing components changing above the frequency f, for example, on the maximum load pressure Plmax of the hydraulic actuators 22, 23, etc. inputted from the maximum load pressure sensor 59. The target value setting section 47A adds the LS differential pressure target value Pgr to the maximum load pressure Plmax of the hydraulic actuators 22, 23, etc. after undergoing the processing by the lowpass filter section and sets the sum as the target value Ps0 of the delivery pressure of the hydraulic pump 30. Also in such cases, effects equivalent to the aforementioned effects can be achieved.

While the target value Pgr of the LS differential pressure is variable by the input device 46 in the above first and second embodiments, the setting of the target value Pgr may be made differently. For example, the target value Pgr of the LS differential pressure may be stored in the LS control device 45 as a preset fixed value. Also in this case, effects equivalent to the aforementioned effects can be achieved.

A third embodiment of the present invention will be described below referring to FIGS. 12 to 14. This embodiment is an embodiment of performing negative control. In this embodiment, components equivalent to those in the above embodiments are assigned the already used reference characters and repeated explanation thereof is omitted properly.

Figure 12:
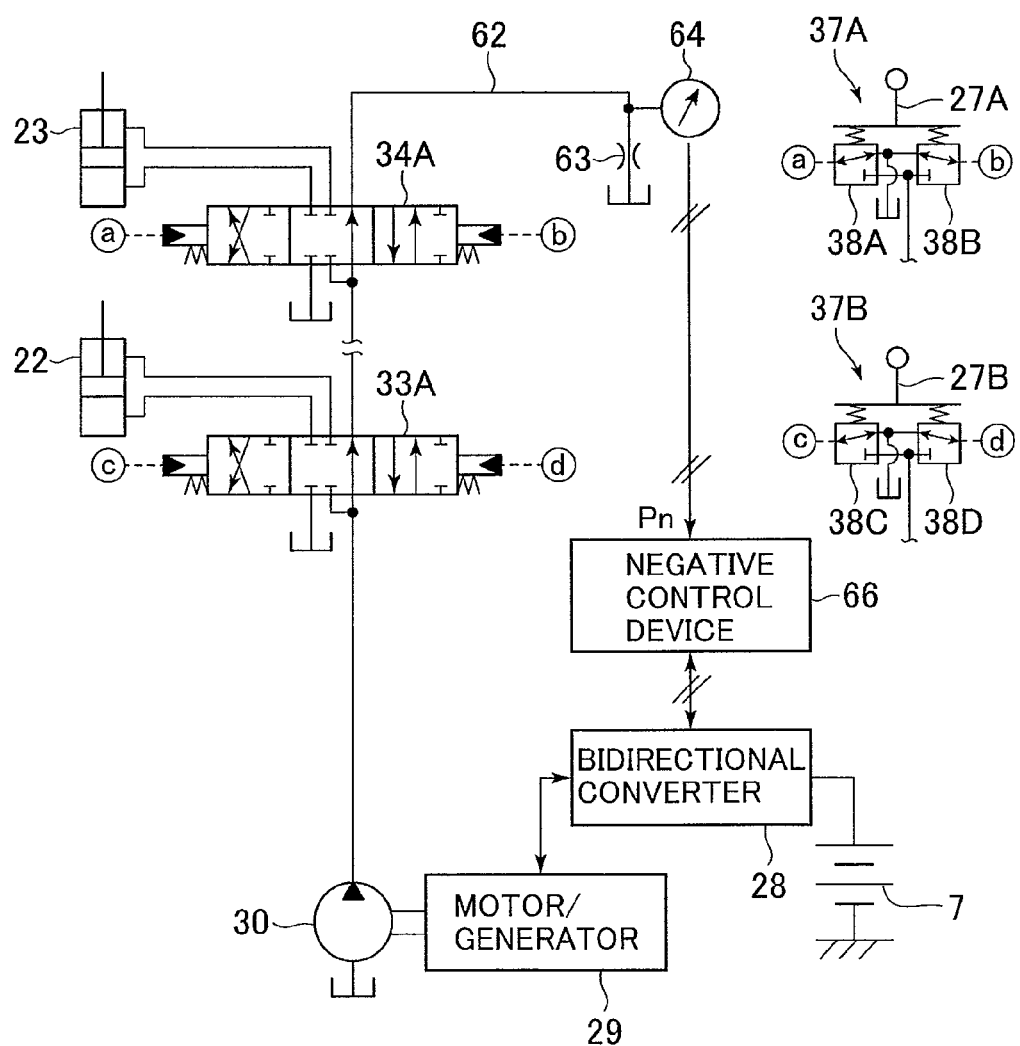
FIG. 12 is a schematic diagram showing the configuration of an electric drive unit in accordance with a third embodiment of the present invention.

FIG. 12 is a schematic diagram showing the configuration of an electric drive unit in accordance with this embodiment.

In this embodiment, a plurality of directional control valves of the open center type are employed for controlling the direction and the flow rate of the hydraulic fluid supplied from the hydraulic pump 30 to the hydraulic actuators 22, 23, etc. Specifically, the plurality of directional control valves include a boom directional control valve 33A and an arm directional control valve 34A which are shown in FIG. 12 and a right travel directional control valve, a left travel directional control valve, a blade directional control valve, a rotation directional control valve, a swing directional control valve and a bucket directional control valve which are not shown in FIG. 12. These directional control valves will hereinafter be referred to as "the directional control valves 33A, 34A, etc." The directional control valves 33A, 34A, etc. are connected in series via a center bypass line 62.

Arranged in a downstream part of the center bypass line 62 are a restrictor 63 for generating control pressure and a control pressure sensor 64 for detecting the pressure on the upstream side of the restrictor 63 as the control pressure Pn. When all the control levers 27A, 27B, etc. are at their neutral positions (i.e., when all the directional control valves 33A, 34A, etc. are at their neutral positions), for example, the flow rate through the center bypass line 62 becomes relatively high and thus the control pressure Pn also becomes relatively high. In contrast, when any one of the control levers 27A, 27B, etc. is at its maximum operation position (i.e., when any one of the directional control valves 33A, 34A, etc. is at its switched position), the flow rate through the center bypass line 62 becomes relatively low and thus the control pressure Pn also becomes relatively low.

Further, the controller 55 of the bidirectional converter 28 calculates the revolution speed (actual value) N of the motor/generator 29 from the magnitude and the phase of the drive current of the motor/generator 29.

Furthermore, a negative control device 66 for controlling the bidirectional converter 28 is provided. The negative control device 66 calculates the delivery flow rate Q of the hydraulic pump 30 based on the revolution speed N of the motor/generator 29 acquired by the bidirectional converter 28 and sets a target value Pn0 of the control pressure corresponding to the delivery flow rate Q. Then, the negative control device 66 performs variable control on the revolution speed of the motor/generator 29 via the bidirectional converter 28 according to the difference ΔPn between the control pressure Pn detected by the control pressure sensor 64 and the target value Pn0.

The details of the negative control device 66 will be explained below referring to FIG. 13. FIG. 13 is a block diagram showing the functional configuration of the negative control device 66 together with related devices.

The negative control device 66 includes a delivery flow rate calculation section 67, a target value setting section 47B, a subtraction section 48B, a lowpass filter section 51B and a motor/generator command calculation section 52B. The delivery flow rate calculation section 67 calculates the delivery flow rate Q of the hydraulic pump 30. The target value setting section 47B sets the target value Pn0 of the control pressure corresponding to the delivery flow rate Q calculated by the delivery flow rate calculation section 67. The subtraction section 48B calculates the difference ΔPn between the control pressure Pn inputted from the control pressure sensor 64 and the target value Pn0 set by the target value setting section 47B. The lowpass filter section 51B performs lowpass filter processing (with a cutoff frequency f) on the difference ΔPn calculated by the subtraction section 48B. The motor/generator command calculation section 52B performs a prescribed calculation process on the difference ΔPn after undergoing the processing by the lowpass filter section 51B (difference ΔPn"), thereby generates a control signal, and outputs the control signal to the bidirectional converter 28.

The delivery flow rate calculation section 67, which has prestored the displacement volume of the hydraulic pump 30 (fixed value), calculates the delivery flow rate Q of the hydraulic pump 30 by multiplying the displacement volume of the hydraulic pump 30 by the revolution speed N of the motor/generator 29 acquired by the bidirectional converter 28.

Figure 14:
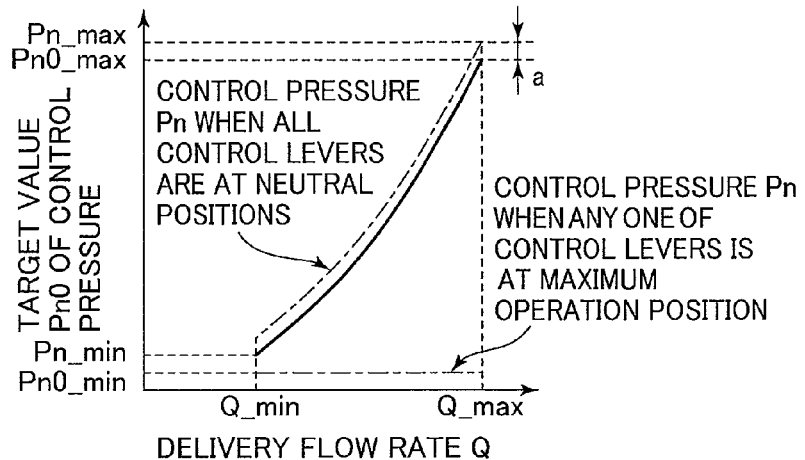
FIG. 14 is a graph for explaining a process executed by a target value setting section shown in FIG. 13.

The target value setting section 47B sets the target value Pn0 of the control pressure corresponding to the delivery flow rate Q of the hydraulic pump 30 calculated by the delivery flow rate calculation section 67 by use of a calculation table represented by the solid line in FIG. 14, for example. This target value Pn0 of the control pressure (for each delivery flow rate Q) in the calculation table has been set to be lower than the control pressure Pn in the case where all the control levers 27A, 27B, etc. are at their neutral positions (i.e., all the directional control valves 33A, 34A, etc. are at their neutral positions) (chain line in FIG. 14) by a prescribed value "a" (specifically, a prescribed value that has previously been set in consideration of the responsiveness of the control, etc.), and to be higher than the control pressure Pn in the case where any one of the control levers 27A, 27B, etc. is at its maximum operation position (i.e., any one of the directional control valves 33A, 34A, etc. is at its switched position) (chain line in FIG. 14).

Therefore, when all the control levers 27A, 27B, etc. are at their neutral positions, for example, the relationship "control pressure Pn>target value Pn0" (i.e., ΔPn>0) is satisfied irrespective of the delivery flow rate Q of the hydraulic pump 30, by which the variable control of the revolution speed of the motor/generator 29 (explained later) proceeds in the direction in which the delivery flow rate Q of the hydraulic pump 30 decreases. Thus, the control pressure Pn and the target value Pn0 decrease while maintaining the relationship "control pressure Pn>target value Pn0", and eventually, the delivery flow rate Q of the hydraulic pump 30 drops to its minimum value (specifically, the revolution speed N of the motor/generator 29 drops to its minimum value). In contrast, when any one of the control levers 27A, 27B, etc. is at its maximum operation position, the relationship "control pressure Pn<target value Pn0" (i.e., ΔPn<0) is satisfied irrespective of the delivery flow rate Q of the hydraulic pump 30, by which the variable control of the revolution speed of the motor/generator 29 (explained later) proceeds in the direction in which the delivery flow rate Q of the hydraulic pump 30 increases. Thus, the target value Pn0 of the control pressure increases while maintaining the relationship "control pressure Pn<target value Pn0", and eventually, the delivery flow rate of the hydraulic pump 30 reaches its maximum value Q_max (specifically, the revolution speed of the motor/generator 29 reaches its maximum value N_max).

Figure 13:
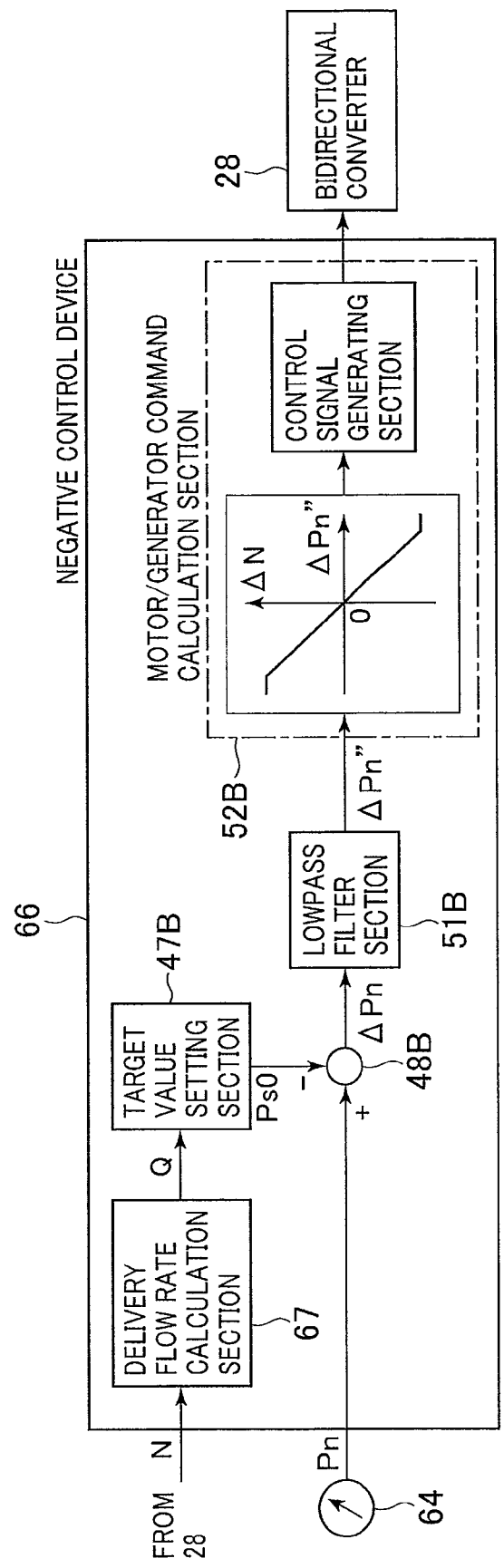
FIG. 13 is a block diagram showing the functional configuration of a negative control device (shown in FIG. 12) together with related devices.

The motor/generator command calculation section 52B has prestored a calculation table which has been set so that the revolution speed difference ΔN of the motor/generator 29 decreases from 0 with the increase in the control pressure difference ΔPn" from 0 and the revolution speed difference ΔN of the motor/generator 29 increases from 0 with the decrease in the control pressure difference ΔPn" from 0 as shown in FIG. 13. Based on the calculation table, the revolution speed difference ΔN of the motor/generator 29 is calculated from the control pressure difference ΔPn" after the processing by the lowpass filter section 51B. A revolution speed command value of this time is calculated by adding the difference ΔN to the revolution speed command value of the previous time (or the actual value of the revolution speed acquired by the bidirectional converter 28). A control signal corresponding to the calculated revolution speed command value is generated and outputted to the bidirectional converter 28.

Similarly to the motor/generator command calculation sections 52 and 52A in the above embodiments, the motor/generator command calculation section 52B has prestored the lower limit and the upper limit of the revolution speed of the motor/generator 29 and limits the aforementioned revolution speed command value with the lower limit and the upper limit. By the limitation, the delivery pressure of the pilot pump (i.e., the source pressure of the pilot pressure in each of the operating devices 37A, 37B, etc.) is secured.

Similarly to the above embodiments, the bidirectional converter 28 makes the motor/generator 29 operate as the motor when the revolution speed of the motor/generator 29 should be increased or maintained (specifically, when the control pressure difference ΔPn"≤0). In contrast, when the revolution speed of the motor/generator 29 should be decreased (specifically, when the control pressure difference ΔPn">0), the bidirectional converter 28 makes the motor/generator 29 operate as the generator (regeneration brake).

In the configuration described above, the control pressure sensor 64 constitutes control pressure detecting means (described in CLAIMS) which detects the pressure on the upstream side of the restrictor (changing according to the change in the control level (switching level) of at least one of the directional control valves switched on the upstream side of the restrictor) as the control pressure. The bidirectional converter 28 constitutes revolution speed acquisition means which acquires the revolution speed of the motor/generator.

The negative control device 66 constitutes command control means which calculates a command value for the motor/generator control means according to the change in a demanded flow rate determined based on operation command levels from the plurality of operating means. The negative control device 66 also constitutes delivery flow rate calculation means which calculates the delivery flow rate of the hydraulic pump based on the revolution speed of the motor/generator acquired by the revolution speed acquisition means and command control means which sets a target value for the control pressure based on the delivery flow rate of the hydraulic pump calculated by the delivery flow rate calculation means and calculates a command value for the motor/generator control means according to the difference between the control pressure detected by the control pressure detecting means and the target value.

Next, the operation and effect of this embodiment will be explained below.

When the operator returns a control lever being operated alone to the neutral position, the corresponding directional control valve is returned from the switched position to the neutral position and the demanded flow rate decreases. Accordingly, the control pressure Pn increases and exceeds the target value Pn0 corresponding to the delivery flow rate Q of the hydraulic pump. Then, the negative control device 66 decreases the revolution speed of the motor/generator 29 via the bidirectional converter 28 according to the difference between the control pressure Pn and the target value Pn0, by which the revolution speed is eventually decreased to the minimum value N_min (i.e., the delivery flow rate of the hydraulic pump 30 is decreased to match with the demanded flow rate). In this case, the bidirectional converter 28 performs regeneration control for converting the inertial force of the rotor of the motor/generator 29 into electric power and thereby charging the electricity storage device 7. Therefore, the operating time of the mini-excavator can be increased through the charging of the electricity storage device 7.

Further, in the negative control device 66 in this embodiment, the lowpass filter section 51B performs the processing for removing the components changing above the frequency f on the difference ΔPn between the control pressure Pn and the target value Pn0 before the motor/generator command calculation section 52B performs the calculation on the difference ΔPn. By the processing, sensitivity (susceptibility) of the variable control of the revolution speed of the motor/generator 29 to fluctuations in the control pressure Pn can be reduced.

A fourth embodiment of the present invention will be described below referring to FIGS. 15 to 17. In this embodiment, positive control is performed. In this embodiment, components equivalent to those in the above embodiments are assigned the already used reference characters and repeated explanation thereof is omitted properly.

Figure 15:
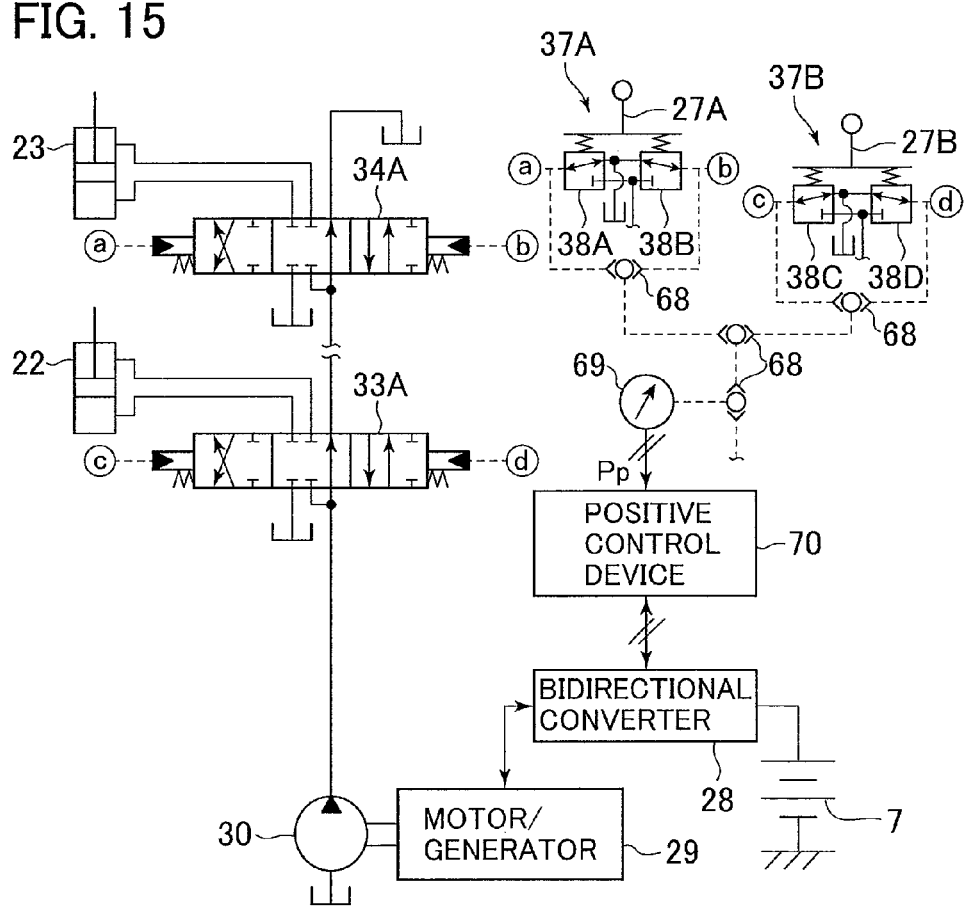
FIG. 15 is a schematic diagram showing the configuration of an electric drive unit in accordance with a fourth embodiment of the present invention.

FIG. 15 is a schematic diagram showing the configuration of an electric drive unit in accordance with this embodiment.

In this embodiment, the controller 55 of the bidirectional converter 28 calculates the revolution speed (actual value) N of the motor/generator 29 from the magnitude and the phase of the drive current of the motor/generator 29 similarly to the controller 55 in the above third embodiment.

Further, a plurality of (seven in this embodiment, only four are shown in FIG. 15) pilot pressure shuttle valves 68 are provided for selecting and extracting the highest pilot pressure Pp from the pilot pressures outputted from the operating devices 37A, 37B, etc. (hereinafter referred to as "the maximum pilot pressure Pp") and a pilot pressure sensor 69 is provided for detecting the output pressure of the final one of the shuttle valves 68 (i.e., the maximum pilot pressure Pp).

Furthermore, a positive control device 70 for controlling the bidirectional converter 28 is provided. The positive control device 70 calculates the delivery flow rate Q of the hydraulic pump 30 based on the revolution speed N of the motor/generator 29 acquired by the bidirectional converter 28, sets a demanded flow rate Qref based on the maximum pilot pressure Pp detected by the pilot pressure sensor 69, and performs variable control on the revolution speed of the motor/generator 29 via the bidirectional converter 28 so that the delivery flow rate Q of the hydraulic pump 30 equals the demanded flow rate Qref.

The details of the positive control device 70 will be explained below referring to FIG. 16. FIG. 16 is a block diagram showing the functional configuration of the positive control device 70 together with related devices.

The positive control device 70 includes a target value setting section 47C, a delivery flow rate calculation section 67, a subtraction section 48C, a lowpass filter section 51C and a motor/generator command calculation section 52C. The target value setting section 47C sets the demanded flow rate Qref (i.e., the target value of the delivery flow rate) based on the maximum pilot pressure Pp detected by the pilot pressure sensor 69. The delivery flow rate calculation section 67 calculates the delivery flow rate Q of the hydraulic pump 30. The subtraction section 48C calculates the difference ΔQ between the delivery flow rate Q calculated by the delivery flow rate calculation section 67 and the demanded flow rate Qref set by the target value setting section 47C. The lowpass filter section 51C performs lowpass filter processing (with a cutoff frequency f) on the difference ΔQ calculated by the subtraction section 48C. The motor/generator command calculation section 52C performs a prescribed calculation process on the difference ΔQ after undergoing the processing by the lowpass filter section 51C (difference ΔQ"), thereby generates a control signal, and outputs the control signal to the bidirectional converter 28.

Figure 17:
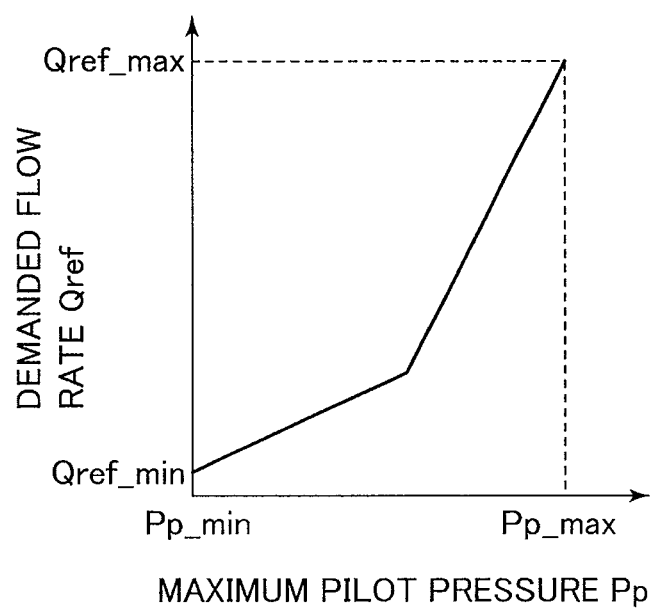
FIG. 17 is a graph for explaining a process executed by a target value setting section shown in FIG. 16.

The target value setting section 47C sets the demanded flow rate Qref corresponding to the maximum pilot pressure Pp based on a calculation table like the one shown in FIG. 17. This demanded flow rate Qref, assuming a case where all the control levers are at their maximum operation positions (i.e., a case where the maximum pilot pressure detected by the pilot pressure sensor 69 is outputted to all the directional control valves 33, 34, etc.), corresponds to the sum of products each of which is calculated by multiplying the opening area of each directional control valve 33A, 34A, etc. by the differential pressure across the directional control valve.

Figure 16:
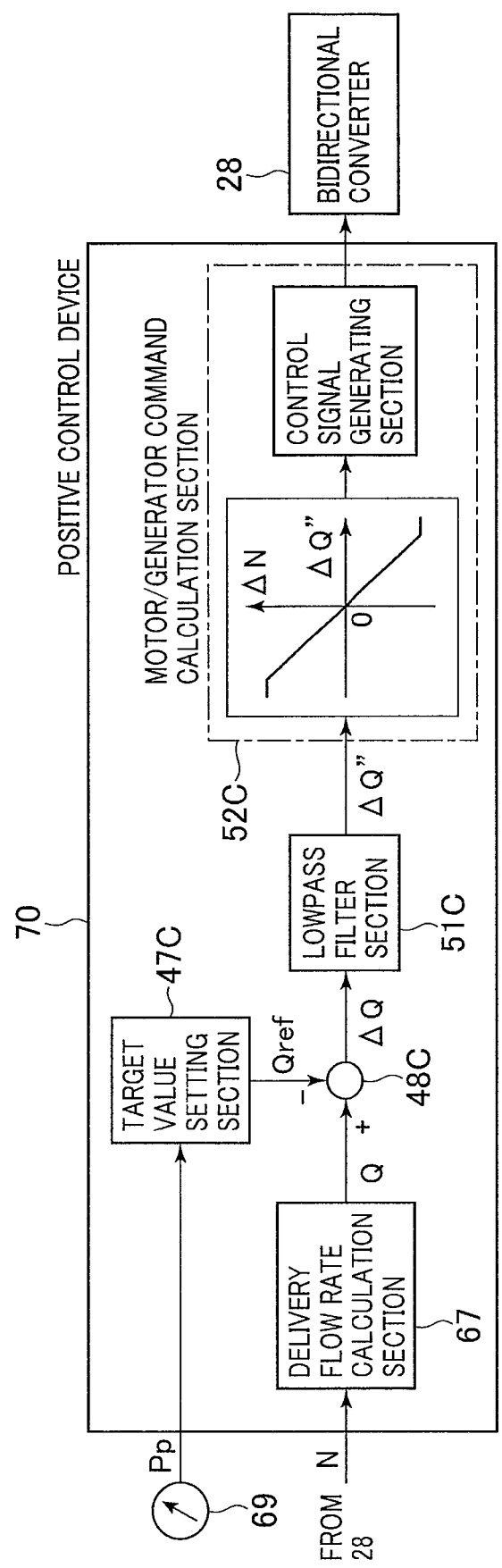
FIG. 16 is a block diagram showing the functional configuration of a positive control device (shown in FIG. 15) together with related devices.

The motor/generator command calculation section 52C has prestored a calculation table which has been set so that the revolution speed difference ΔN of the motor/generator 29 decreases from 0 with the increase in the delivery flow rate difference ΔQ" of the hydraulic pump 30 from 0 and the revolution speed difference ΔN of the motor/generator 29 increases from 0 with the decrease in the delivery flow rate difference ΔQ" of the hydraulic pump 30 from 0 as shown in FIG. 16, for example. Based on the calculation table, the revolution speed difference ΔN of the motor/generator 29 is calculated from the delivery flow rate difference ΔQ" of the hydraulic pump 30 after the processing by the lowpass filter section 51C. A revolution speed command value of this time is calculated by adding the difference ΔN to the revolution speed command value of the previous time (or the actual value of the revolution speed acquired by the bidirectional converter 28). A control signal corresponding to the calculated revolution speed command value is generated and outputted to the bidirectional converter 28.

Similarly to the motor/generator command calculation sections 52 to 52B in the above embodiments, the motor/generator command calculation section 52C has prestored the lower limit and the upper limit of the revolution speed of the motor/generator 29 and limits the aforementioned revolution speed command value with the lower limit and the upper limit. By the limitation, the delivery pressure of the pilot pump (i.e., the source pressure of the pilot pressure in each of the operating devices 37A, 37B, etc.) is secured.

Similarly to the above embodiments, the bidirectional converter 28 makes the motor/generator 29 operate as the motor when the revolution speed of the motor/generator 29 should be increased or maintained (specifically, when the delivery flow rate difference $\Delta Q''$ of the hydraulic pump $30 \leq 0$). In contrast, when the revolution speed of the motor/generator 29 should be decreased (specifically, when the delivery flow rate difference $\Delta Q''$ of the hydraulic pump $30 > 0$), the bidirectional converter 28 makes the motor/generator 29 operate as the generator (regeneration brake).

In the configuration described above, the pilot pressure sensor 69 constitutes maximum operation amount detecting means (described in CLAIMS) which detects the maximum operation amount of the plurality of operating means. The positive control device 70 constitutes command control means which calculates a command value for the motor/generator control means according to the change in a demanded flow rate determined based on operation command levels from the plurality of operating means. The positive control device 70 also constitutes delivery flow rate calculation means which calculates the delivery flow rate of the hydraulic pump based on the revolution speed of the motor/generator acquired by the revolution speed acquisition means, and command control means which sets the demanded flow rate based on the maximum operation amount of the plurality of operating means detected by the maximum operation amount detecting means and calculates a command value for the motor/generator control means according to the difference between the delivery flow rate of the hydraulic pump calculated by the delivery flow rate calculation means and the demanded flow rate so that the delivery flow rate of the hydraulic pump equals the demanded flow rate.

Next, the operation and effect of this embodiment will be explained below.

When the operator returns a control lever being operated alone to the neutral position, the maximum pilot pressure Pp decreases, the corresponding directional control valve is returned from the switched position to the neutral position, and the demanded flow rate Qref decreases. Then, the positive control device 70 decreases the revolution speed of the motor/generator 29 via the bidirectional converter 28 so that the delivery flow rate Q of the hydraulic pump 30 equals the demanded flow rate Qref. In this case, the bidirectional converter 28 performs regeneration control for converting the inertial force of the rotor of the motor/generator 29 into electric power and thereby charging the electricity storage device 7. Therefore, the operating time of the mini-excavator can be increased through the charging of the electricity storage device 7.

Further, in the positive control device 70 in this embodiment, the lowpass filter section 51C performs the processing for removing the components changing above the frequency f on the difference $\Delta Q$ between the delivery flow rate Q and the demanded flow rate Qref of the hydraulic pump 30 before the motor/generator command calculation section 52C performs the calculation on the difference $\Delta Q$. By the processing, sensitivity (susceptibility) of the variable control of the revolution speed of the motor/generator 29 to fluctuations in the demanded flow rate Qref can be reduced. Consequently, the hunting can be suppressed.

Although not explained in the above fourth embodiment, it is also possible to provide an input device (unshown) allowing for inputting a proportionality factor for changing the operating speeds of the hydraulic actuators and to make the target value setting section of the positive control device correct the demanded flow rate Qref by multiplying it by the proportionality factor inputted from the input device. Also in such cases, effects equivalent to the aforementioned effects can be achieved.

While the operating devices 37A, 37B, etc. of the hydraulic pilot type (each outputting pilot pressure corresponding to the operating position of the control lever) are employed as an example of the plurality of operating means in the explanation of the above first through fourth embodiments, the plurality of operating means are not restricted to the hydraulic pilot type. For example, operating devices of the electric lever type (each outputting an electric operation signal corresponding to the operating position of the control lever) may also be employed. When operating devices of the electric lever type are employed in the above fourth embodiment, a calculation section which selects and extracts a signal of the greatest operation amount from the electric operation signals outputted from the operating devices may be provided as the maximum operation amount detecting means. Also in such cases, effects equivalent to the aforementioned effects can be achieved.

The bidirectional converter 28 is configured to be selectively operable in a first control mode for supplying the electric power from the electricity storage device 7 to the motor/generator 29 to drive the motor/generator 29 and in a second control mode for supplying the electric power from the external power supply to the electricity storage device 7 to charge the electricity storage device 7 and the regeneration control is performed when the revolution speed of the motor/generator 29 is decreased in the first control mode in the explanation of the above first through fourth embodiments. However, the bidirectional converter 28 may be operated differently. Specifically, the bidirectional converter 28 may also be configured to be selectively operable in the aforementioned first control modes, in the aforementioned second control mode, in a third control mode for supplying the electric power from the external power supply to the motor/generator 29 to drive the motor/generator 29, and in a fourth control mode for supplying the electric power from the external power supply to the motor/generator 29 and the electricity storage device 7 to drive the motor/generator 29 while charging the electricity storage device 7, depending on the operation on a mode selection switch (unshown). When the revolution speed of the motor/generator 29 is decreased in the third or fourth control mode, the regeneration control may be performed while temporarily interrupting the supply of the electric power from the external power supply. Also in such cases, effects equivalent to the aforementioned effects can be achieved.

While the above description has been given by taking a mini-excavator as an example of the target of application of the present invention, the present invention is applicable also to middle-size or large-size hydraulic excavators (operating mass $\geq 6$ tons). Further, the present invention is applicable not only to hydraulic excavators but also to other types of construction machines such as hydraulic cranes.

DESCRIPTION OF REFERENCE CHARACTERS

7 Electricity storage device
13A Travel hydraulic motor
13B Travel hydraulic motor
15 Blade hydraulic cylinder
17 Rotation hydraulic motor
18 Swing hydraulic cylinder
22 Boom hydraulic cylinder
23 Arm hydraulic cylinder
24 Bucket hydraulic cylinder
28 Bidirectional converter (motor/generator control means, revolution speed acquisition means)

29 Motor/generator
30 Hydraulic pump
33, 33A Boom directional control valve
34, 34A Arm directional control valve
35, 35A Boom pressure compensating valve
36, 36A Arm pressure compensating valve
37A Operating device (operating means)
37B Operating device (operating means)
40, 40A, 40B, 40C LS differential pressure detecting device (differential pressure detecting means)
45, 45A Load sensing control device (command control means)
58 Delivery pressure sensor (delivery pressure detecting means)
59 Maximum load pressure sensor (maximum load pressure detecting means)
62 Center bypass line
63 Restrictor
64 Control pressure sensor (control pressure detecting means)
66 Negative control device (command control means, delivery flow rate calculation means)
69 Pilot pressure sensor (maximum operation amount detecting means)
70 Positive control device (command control means, delivery flow rate calculation means)

The invention claimed is:

1. An electric drive unit for a construction machine equipped with an electricity storage device, a motor/generator which supplies and receives electric power to/from the electricity storage device, a hydraulic pump which is driven by the motor/generator, a plurality of hydraulic actuators, a plurality of operating devices which command the operation of the hydraulic actuators, and a plurality of directional control valves which respectively control the direction and the flow rate of hydraulic fluid supplied from the hydraulic pump to the hydraulic actuators according to operating directions and operation amounts of the plurality of operating devices, the electric drive unit comprising:

a bidirectional converter which performs variable control of a revolution speed of the motor/generator; and a command control device which calculates a command value for the bidirectional converter to change a delivery flow rate of the hydraulic pump according to a change in a demanded flow rate determined based on operation command levels from the plurality of operating device, wherein the bidirectional converter performs regeneration control for converting inertial force of a rotor of the motor/generator into electric power and thereby charges the electricity storage device when the revolution speed of the motor/generator decreased so that the delivery flow rate of the hydraulic pump is decreased in response to a decrease in the demanded flow rate, the electric drive unit further comprising:

a plurality of pressure compensating valves which perform control so that a differential pressure across each of the directional control valves equals a load sensing differential pressure defined as a differential pressure between a delivery pressure of the hydraulic pump and a maximum load pressure of the hydraulic actuators; and a load sensing differential pressure detecting device which detects the load sensing differential pressure, the command control device being a load sensing control device which calculates the command value for the bidirectional converter according to a difference between the load sensing differential pressure detected by the load sensing differential pressure detecting device and a preset target value so that the load sensing differential pressure equals the target value and the delivery flow rate of the hydraulic pump matches with the demanded flow rate, and the bidirectional converter performs the regeneration control for converting the inertial force of the rotor of the motor/generator into electric power and thereby charges the electricity storage device when the revolution speed of the motor/generator is decreased in response to an excess of the load sensing differential pressure over the target value so that the delivery flow rate of the hydraulic pump is decreased.

2. An electric drive unit for a construction machine equipped with an electricity storage device, a motor/generator which supplies and receives electric power to/from the electricity storage device, a hydraulic pump which is driven by the motor/generator, a plurality of hydraulic actuators, a plurality of operating devices which command the operation of the hydraulic actuators, and a plurality of directional control valves which respectively control the direction and the flow rate of hydraulic fluid supplied from the hydraulic pump to the hydraulic actuators according to operating directions and operation amounts of the plurality of operating devices, the electric drive unit comprising:

a bidirectional converter which performs variable control of a revolution speed of the motor/generator; and a command control device which calculates a command value for the bidirectional converter to change a delivery flow rate of the hydraulic pump according to a change in a demanded flow rate determined based on operation command levels from the plurality of operating devices, wherein the bidirectional converter performs regeneration control for converting inertial forces of a rotor of the motor/generator into electric power and thereby charges the electricity storage device when the revolution speed of the motor/generator is decreased in response to a decrease in the demanded flow rate, the electric drive unit further comprising:

a plurality of pressure compensating valves which perform control so that a differential pressure across each of the directional control valves equals a load sensing differential pressure defined as a differential pressure between a delivery pressure of the hydraulic pump and a maximum load pressure of the hydraulic actuators;

a delivery pressure sensor which detects the delivery pressure of the hydraulic pump; and a maximum load pressure sensor which detects the maximum load pressure of the hydraulic actuators via a shuttle valve, the command control device being a load sensing control device which sets a target value for the delivery pressure of the hydraulic pump based on the maximum load pressure of the hydraulic actuators detected by the maximum load pressure sensor and calculates the command value for the bidirectional converter according to a difference between the delivery pressure of the hydraulic pump detected by the delivery pressure sensor and the target value so that the delivery pressure of the hydraulic pump equals the target value and the delivery flow rate of the hydraulic pump matches with the demanded flow rate, and the bidirectional converter performs the regeneration control for converting the inertial force of the rotor of the motor/generator into electric power and thereby charges the electricity storage device when the revolution speed of the motor/generator is decreased in response to an excess of the delivery pressure of the hydraulic pump over the target value so that the delivery flow rate of the hydraulic pump is decreased.

3. An electric drive unit for a construction machine equipped with an electricity storage device, a motor/generator which supplies and receives electric power to/from the electricity storage device, a hydraulic pump which is driven by the motor/generator, a plurality of hydraulic actuators, a plurality of operating devices which command the operation of the hydraulic actuators, and a plurality of directional control valves of the open center type which respectively control the direction and the flow rate of hydraulic fluid supplied from the hydraulic pump to the hydraulic actuators according to operating directions and operation amounts of the plurality of operating device, the electric drive unit comprising:
- a bidirectional converter which performs variable control of a revolution speed of the motor/generator; and
- a command control device which calculates a command value for the bidirectional converter to change a delivery flow rate of the hydraulic pump according to a change in a demanded flow rate determined based on operation command levels from the plurality of operating device,
- wherein the bidirectional converter performs regeneration control for converting inertial force of a rotor of the motor/generator into electric power and thereby charges the electricity storage device when the revolution speed of the motor/generator is decreased so that the delivery flow rate of the hydraulic pump is decreased in response to a decrease in the demanded flow rate,
the electric drive unit further comprising:
- a restrictor which is arranged in a downstream part of a center bypass line of the directional control valves; and
- a control pressure sensor which detects pressure on an upstream side of the restrictor, and which changes according to a change in the control level of at least one of the directional control valves switched on the upstream side of the restrictor, as a control pressure, the bidirectional converter acquiring the revolution speed of the motor/generator,
- the command control device being a negative control device which calculates the delivery flow rate of the hydraulic pump based on the revolution speed of the motor/generator acquired by the bidirectional converter, sets a target value for the control pressure based on the delivery flow rate of the hydraulic pump and calculates the command value for the bidirectional converter according to a difference between the control pressure detected by the control pressure sensor and the target value so that the delivery flow rate of the hydraulic pump matches with the demanded flow rate, and
- the bidirectional converter performing the regeneration control for converting the inertial force of the rotor of the motor/generator into electric power and thereby charging the electricity storage device when the revolution speed of the motor/generator is decreased in response to an excess of the control pressure over the target value so that the delivery flow rate of the hydraulic pump is decreased.

4. An electric drive unit for a construction machine equipped with an electricity storage device, a motor/generator which supplies and receives electric power to/from the electricity storage device, a hydraulic pump which is driven by the motor/generator, a plurality of hydraulic actuators, a plurality of operating devices which command the operation of the hydraulic actuators, and a plurality of directional control valves which respectively control the direction and the flow rate of hydraulic fluid supplied from the hydraulic pump to the hydraulic actuators according to operating directions and operation amounts of the plurality of operating devices, the electric drive unit comprising:
- a bidirectional converter which performs variable control of a revolution speed of the motor/generator; and
- a command control device which calculates a command value for the bidirectional converter to change a delivery flow rate of the hydraulic pump according to a change in a demanded flow rate determined based on operation command levels from the plurality of operating devices,
- wherein the bidirectional converter performs regeneration control for converting inertial force of a rotor of the motor/generator into electric power and thereby charges the electricity storage device when the revolution speed of the motor/generator is decreased so that the delivery flow rate of the hydraulic pump is decreased in response to a decrease in the demanded flow rate,
the electric drive unit further comprising:
- a maximum operation amount detecting device which detects a maximum operation amount of the plurality of operating devices,
- the bidirectional converter acquiring the revolution speed of the motor/generator,
- the command control device being a positive control device which calculates the delivery flow rate of the hydraulic pump based on the revolution speed of the motor/generator acquired by the bidirectional converter, sets the demanded flow rate based on the maximum operation amount of the plurality of operating devices detected by the maximum operation amount detecting device and calculates the command value for the bidirectional converter according to a difference between the delivery flow rate of the hydraulic pump and the demanded flow rate so that the delivery flow rate of the hydraulic pump equals the demanded flow rate, and
- the bidirectional converter performing the regeneration control for converting the inertial force of the rotor of the motor/generator into electric power and thereby charging the electricity storage device when the revolution speed of the motor/generator is decreased in response to an excess of the delivery flow rate of the hydraulic pump over the demanded flow rate so that the delivery flow rate of the hydraulic pump is decreased.

* * * * *